US008840457B1

(12) United States Patent
Basallo et al.

(10) Patent No.: US 8,840,457 B1
(45) Date of Patent: Sep. 23, 2014

(54) GAMING SYSTEM AND METHOD PROVIDING A SLOT GAME EMPLOYING A RANDOMLY SELECTED SET OF REELS

(71) Applicant: IGT, Reno, NV (US)

(72) Inventors: Leandro Basallo, San Francisco, CA (US); Timothy L. Isaacson, Alameda, CA (US); Jon M. Leupp, Orinda, CA (US); Brian F. Saunders, Sunnyvale, CA (US); Mark C. Nicely, Daly City, CA (US); Nguyen T. Louie, San Francisco, CA (US)

(73) Assignee: IGT, Las Vegas, NV (US)

( * ) Notice: Subject to any disclaimer, the term of this patent is extended or adjusted under 35 U.S.C. 154(b) by 25 days.

(21) Appl. No.: 13/784,070

(22) Filed: Mar. 4, 2013

(51) Int. Cl.
*A63F 13/00* (2014.01)
*A63F 9/24* (2006.01)
*G07F 17/34* (2006.01)

(52) U.S. Cl.
CPC .................................... *G07F 17/34* (2013.01)
USPC ............................................ 463/20; 463/16

(58) Field of Classification Search
None
See application file for complete search history.

(56) References Cited

U.S. PATENT DOCUMENTS

| | | | |
|---|---|---|---|
| 3,420,525 | A | 1/1969 | Waders |
| 3,618,952 | A | 11/1971 | Tallarida |
| 3,633,915 | A | 1/1972 | Lippert |
| 3,642,287 | A | 2/1972 | Tojza et al. |
| 3,735,987 | A | 5/1973 | Ohki |
| 4,099,722 | A | 7/1978 | Rodesch et al. |
| 4,198,052 | A | 4/1980 | Gauselmann |
| 4,200,291 | A | 4/1980 | Hooker |
| 4,326,351 | A | 4/1982 | Heywood et al. |
| 4,410,178 | A | 10/1983 | Partridge |
| 4,448,419 | A | 5/1984 | Telnaes |
| 4,517,558 | A | 5/1985 | Davids |
| 4,582,324 | A | 4/1986 | Koza et al. |
| 4,618,150 | A | 10/1986 | Kimura et al. |
| 4,624,459 | A | 11/1986 | Kaufman et al. |
| 4,669,731 | A | 6/1987 | Clarke |
| 4,695,053 | A | 9/1987 | Vazquez et al. |
| 4,732,386 | A | 3/1988 | Rayfiel |
| 4,756,531 | A | 7/1988 | Dire et al. |
| 4,790,537 | A | 12/1988 | Smyth et al. |
| 4,805,907 | A | 2/1989 | Hagiwara |
| 4,811,953 | A | 3/1989 | Jeng |
| 4,826,169 | A | 5/1989 | Bessho et al. |
| 4,838,552 | A | 6/1989 | Hagiwara |
| 4,871,171 | A | 10/1989 | Rivero |
| 4,874,173 | A | 10/1989 | Kishishita et al. |
| 4,978,129 | A | 12/1990 | Komeda et al. |

(Continued)

*Primary Examiner* — Dmitry Suhol
*Assistant Examiner* — Jason Yen
(74) *Attorney, Agent, or Firm* — Neal, Gerber & Eisenberg LLP

(57) ABSTRACT

Various embodiments of the present disclosure are directed to a gaming system and method providing a slot game employing a set of randomly selected reels. In one embodiment, the gaming system is configured to operate a slot game associated with a plurality of adjacently arranged reels including a plurality of symbols. Each of a plurality of the reels is associated with one of a plurality of different features and an indicator representing that feature. The gaming system begins sequentially displaying the reels and any corresponding indicators. The gaming system selects a set of two or more of the reels and stops sequentially displaying the reels such that the selected reels are displayed. The gaming system generates and displays a plurality of the symbols on the selected reels, determines whether any winning symbol combinations are displayed, determines any awards associated with any displayed winning symbol combinations, and displays any determined awards.

20 Claims, 17 Drawing Sheets

(56) References Cited

U.S. PATENT DOCUMENTS

| | | | |
|---|---|---|---|
| 4,991,848 | A | 2/1991 | Greenwood et al. |
| 5,046,736 | A | 9/1991 | Bridgeman et al. |
| 5,085,436 | A | 2/1992 | Bennett |
| 5,098,107 | A | 3/1992 | Boylan et al. |
| 5,102,134 | A | 4/1992 | Smyth |
| 5,102,137 | A | 4/1992 | Ekiert |
| 5,123,649 | A | 6/1992 | Tiberio |
| 5,152,529 | A | 10/1992 | Okada |
| 5,178,390 | A | 1/1993 | Okada |
| 5,205,555 | A | 4/1993 | Hamano |
| RE34,244 | E | 5/1993 | Hagiwara |
| 5,248,142 | A | 9/1993 | Breeding et al. |
| 5,342,047 | A | 8/1994 | Heidel |
| 5,342,049 | A | 8/1994 | Wichinsky et al. |
| 5,364,100 | A | 11/1994 | Ludlow et al. |
| 5,382,023 | A | 1/1995 | Roberts |
| 5,393,057 | A | 2/1995 | Marnell et al. |
| 5,393,061 | A | 2/1995 | Manship et al. |
| 5,395,111 | A | 3/1995 | Inoue |
| 5,397,125 | A | 3/1995 | Adams et al. |
| 5,423,539 | A | 6/1995 | Nagao |
| 5,449,173 | A | 9/1995 | Thomas et al. |
| 5,456,465 | A | 10/1995 | Durham |
| 5,462,277 | A | 10/1995 | Takemoto |
| 5,494,287 | A | 2/1996 | Manz |
| 5,511,781 | A | 4/1996 | Wood et al. |
| 5,524,888 | A | 6/1996 | Heidel |
| 5,542,669 | A | 8/1996 | Charron et al. |
| 5,560,603 | A | 10/1996 | Seelig et al. |
| 5,569,084 | A | 10/1996 | Nicastro et al. |
| 5,580,053 | A | 12/1996 | Crouch |
| 5,580,055 | A | 12/1996 | Hagiwara |
| 5,580,309 | A | 12/1996 | Piechowiak et al. |
| 5,584,763 | A | 12/1996 | Kelly et al. |
| 5,584,764 | A | 12/1996 | Inoue |
| 5,609,524 | A | 3/1997 | Inoue et al. |
| 5,611,535 | A | 3/1997 | Tiberio |
| 5,633,993 | A | 5/1997 | Redmann et al. |
| 5,645,485 | A | 7/1997 | Clapper et al. |
| 5,647,798 | A | 7/1997 | Falciglia |
| 5,695,188 | A | 12/1997 | Ishibashi et al. |
| 5,697,843 | A | 12/1997 | Manship et al. |
| 5,704,835 | A | 1/1998 | Dietz |
| 5,711,525 | A | 1/1998 | Breeding et al. |
| 5,722,891 | A | 3/1998 | Inoue |
| 5,752,881 | A | 5/1998 | Inoue |
| 5,766,074 | A | 6/1998 | Cannon et al. |
| 5,769,716 | A | 6/1998 | Saffari et al. |
| 5,772,509 | A | 6/1998 | Weiss et al. |
| 5,775,692 | A | 7/1998 | Watts et al. |
| 5,779,544 | A | 7/1998 | Seelig et al. |
| 5,788,573 | A | 8/1998 | Baerlocher et al. |
| 5,788,574 | A | 8/1998 | Ornstein et al. |
| 5,807,172 | A | 9/1998 | Piechowiak |
| 5,816,918 | A | 10/1998 | Kelly et al. |
| 5,823,874 | A | 10/1998 | Adams et al. |
| 5,823,879 | A | 10/1998 | Goldberg et al. |
| 5,833,537 | A | 11/1998 | Barrie |
| 5,833,538 | A | 11/1998 | Weiss |
| 5,848,932 | A | 12/1998 | Adams et al. |
| 5,851,147 | A | 12/1998 | Stupak et al. |
| 5,851,148 | A | 12/1998 | Brune et al. |
| 5,855,514 | A | 1/1999 | Kamille et al. |
| 5,863,249 | A | 1/1999 | Inoue |
| 5,873,781 | A | 2/1999 | Keane et al. |
| 5,876,284 | A | 3/1999 | Acres et al. |
| 5,882,261 | A | 3/1999 | Adams et al. |
| 5,890,962 | A | 4/1999 | Takemoto et al. |
| 5,910,048 | A | 6/1999 | Feinberg |
| 5,919,088 | A | 7/1999 | Weiss et al. |
| 5,927,714 | A | 7/1999 | Kaplan |
| 5,934,672 | A | 8/1999 | Sines et al. |
| 5,935,002 | A | 8/1999 | Falciglia |
| 5,947,820 | A | 9/1999 | Morro et al. |
| 5,951,397 | A | 9/1999 | Dickinson |
| 5,967,893 | A | 10/1999 | Lawrence et al. |
| 5,976,016 | A | 11/1999 | Moody et al. |
| 5,980,384 | A | 11/1999 | Barrie |
| 5,984,781 | A | 11/1999 | Sunaga |
| 5,984,782 | A | 11/1999 | Inoue |
| 5,993,316 | A | 11/1999 | Coyle et al. |
| 5,997,400 | A | 12/1999 | Seelig et al. |
| 5,997,401 | A | 12/1999 | Crawford |
| 6,003,867 | A | 12/1999 | Rodesch et al. |
| 6,004,207 | A | 12/1999 | Wilson et al. |
| 6,004,208 | A | 12/1999 | Takemoto et al. |
| 6,012,982 | A | 1/2000 | Piechowiak et al. |
| 6,012,983 | A | 1/2000 | Walker et al. |
| 6,015,346 | A | 1/2000 | Bennett |
| 6,019,369 | A | 2/2000 | Nakagawa et al. |
| 6,027,115 | A | 2/2000 | Griswold et al. |
| 6,033,307 | A | 3/2000 | Vancura et al. |
| 6,048,269 | A | 4/2000 | Burns et al. |
| 6,056,642 | A | 5/2000 | Bennett |
| 6,059,289 | A | 5/2000 | Vancura et al. |
| 6,059,658 | A | 5/2000 | Mangano et al. |
| 6,062,980 | A | 5/2000 | Luciano |
| 6,062,981 | A | 5/2000 | Luciano |
| 6,068,552 | A | 5/2000 | Walker et al. |
| 6,077,163 | A | 6/2000 | Walker et al. |
| 6,086,066 | A | 7/2000 | Takeuchi et al. |
| 6,089,976 | A | 7/2000 | Schneider et al. |
| 6,089,978 | A | 7/2000 | Adams |
| 6,093,102 | A | 7/2000 | Bennett et al. |
| 6,095,921 | A | 8/2000 | Walker et al. |
| 6,102,798 | A | 8/2000 | Bennett |
| 6,109,610 | A | 8/2000 | Cherry et al. |
| 6,110,041 | A | 8/2000 | Walker et al. |
| 6,120,031 | A | 9/2000 | Adams et al. |
| 6,120,377 | A | 9/2000 | McGinnis et al. |
| 6,120,378 | A | 9/2000 | Moody et al. |
| 6,123,333 | A | 9/2000 | McGinnis et al. |
| 6,126,541 | A | 10/2000 | Fuchs et al. |
| 6,126,542 | A | 10/2000 | Fier |
| 6,135,884 | A | 10/2000 | Hedrick et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,270 | A | 11/2000 | Huard et al. |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura et al. |
| 6,159,098 | A | 12/2000 | Slomiany et al. |
| 6,162,121 | A | 12/2000 | Morro et al. |
| 6,165,070 | A | 12/2000 | Nolte et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,174,233 | B1 | 1/2001 | Sunaga et al. |
| 6,174,234 | B1 | 1/2001 | Seibert, Jr. et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,200,217 | B1 | 3/2001 | Osawa |
| 6,203,429 | B1 | 3/2001 | Demar et al. |
| 6,203,430 | B1 | 3/2001 | Walker et al. |
| 6,210,277 | B1 | 4/2001 | Stefan |
| 6,210,279 | B1 | 4/2001 | Dickinson |
| 6,213,875 | B1 | 4/2001 | Suzuki |
| 6,213,876 | B1 | 4/2001 | Moore, Jr. |
| 6,217,022 | B1 | 4/2001 | Astaneha |
| 6,224,483 | B1 | 5/2001 | Mayeroff |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,241,607 | B1 | 6/2001 | Payne et al. |
| 6,244,957 | B1 | 6/2001 | Walker et al. |
| 6,251,013 | B1 | 6/2001 | Bennett |
| 6,261,177 | B1 | 7/2001 | Bennett |

(56) References Cited

U.S. PATENT DOCUMENTS

| | | | |
|---|---|---|---|
| 6,261,178 | B1 | 7/2001 | Bennett |
| 6,270,409 | B1 | 8/2001 | Shuster |
| 6,270,411 | B1 | 8/2001 | Gura et al. |
| 6,270,412 | B1 | 8/2001 | Crawford et al. |
| 6,279,902 | B1 | 8/2001 | Yamazaki et al. |
| 6,283,855 | B1 | 9/2001 | Bingham |
| 6,290,600 | B1 | 9/2001 | Glasson |
| 6,290,603 | B1 | 9/2001 | Luciano, Jr. |
| 6,299,165 | B1 | 10/2001 | Nagano |
| 6,302,790 | B1 | 10/2001 | Brossard |
| 6,302,791 | B1 | 10/2001 | Frohm et al. |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,662 | B1 | 11/2001 | Jorasch et al. |
| 6,315,663 | B1 | 11/2001 | Sakamoto |
| 6,315,664 | B1 | 11/2001 | Baerlocher et al. |
| 6,322,078 | B1 | 11/2001 | Adams |
| 6,322,309 | B1 | 11/2001 | Thomas et al. |
| 6,328,649 | B1 | 12/2001 | Randall et al. |
| 6,334,814 | B1 | 1/2002 | Adams |
| 6,336,860 | B1 | 1/2002 | Webb |
| 6,336,862 | B1 | 1/2002 | Byrne |
| 6,346,043 | B1 | 2/2002 | Colin et al. |
| 6,347,996 | B1 | 2/2002 | Gilmore et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,364,767 | B1 | 4/2002 | Brossard et al. |
| 6,375,187 | B1 | 4/2002 | Baerlocher |
| 6,375,570 | B1 | 4/2002 | Poole |
| 6,379,245 | B2 | 4/2002 | De Keller |
| 6,394,902 | B1 | 5/2002 | Glavich et al. |
| 6,398,218 | B1 | 6/2002 | Vancura |
| 6,398,220 | B1 | 6/2002 | Inoue |
| 6,413,161 | B1 | 7/2002 | Baerlocher et al. |
| 6,413,162 | B1 | 7/2002 | Baerlocher et al. |
| 6,419,579 | B1 | 7/2002 | Bennett |
| 6,428,412 | B1 | 8/2002 | Anderson et al. |
| 6,439,995 | B1 | 8/2002 | Hughs-Baird et al. |
| 6,443,837 | B1 | 9/2002 | Jaffe et al. |
| 6,454,266 | B1 | 9/2002 | Breeding et al. |
| 6,461,241 | B1 | 10/2002 | Webb et al. |
| 6,464,581 | B1 | 10/2002 | Yoseloff et al. |
| 6,464,582 | B1 | 10/2002 | Baerlocher et al. |
| 6,468,156 | B1 | 10/2002 | Hughs-Baird et al. |
| 6,471,208 | B2 | 10/2002 | Yoseloff et al. |
| 6,491,584 | B2 | 12/2002 | Graham et al. |
| 6,494,454 | B2 | 12/2002 | Adams |
| 6,494,785 | B1 | 12/2002 | Gerrard et al. |
| 6,506,118 | B1 | 1/2003 | Baerlocher et al. |
| 6,514,141 | B1 | 2/2003 | Kaminkow et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,561,899 | B2 | 5/2003 | Vancura |
| 6,561,900 | B1 | 5/2003 | Baerlocher et al. |
| 6,565,436 | B1 | 5/2003 | Baerlocher |
| 6,569,013 | B1 | 5/2003 | Taylor |
| 6,569,015 | B1 | 5/2003 | Baerlocher et al. |
| 6,569,016 | B1 | 5/2003 | Baerlocher |
| 6,575,830 | B2 | 6/2003 | Baerlocher et al. |
| 6,582,306 | B1 | 6/2003 | Kaminkow |
| 6,585,591 | B1 | 7/2003 | Baerlocher et al. |
| 6,589,114 | B2 | 7/2003 | Rose |
| 6,595,854 | B2 | 7/2003 | Hughs-Baird et al. |
| 6,599,192 | B1 | 7/2003 | Baerlocher et al. |
| 6,602,137 | B2 | 8/2003 | Kaminkow et al. |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,607,438 | B2 | 8/2003 | Baerlocher et al. |
| 6,609,971 | B2 | 8/2003 | Vancura |
| 6,609,972 | B2 | 8/2003 | Seelig et al. |
| 6,612,927 | B1 | 9/2003 | Slomiany et al. |
| 6,616,142 | B2 | 9/2003 | Adams |
| 6,620,045 | B2 | 9/2003 | Berman et al. |
| 6,632,139 | B1 | 10/2003 | Baerlocher |
| 6,632,141 | B2 | 10/2003 | Webb et al. |
| 6,634,945 | B2 | 10/2003 | Glavich et al. |
| 6,648,754 | B2 | 11/2003 | Baerlocher et al. |
| 6,648,759 | B2 | 11/2003 | Vancura |
| 6,659,864 | B2 | 12/2003 | McGahn et al. |
| 6,676,512 | B2 | 1/2004 | Fong et al. |
| 6,688,977 | B1 | 2/2004 | Baerlocher et al. |
| 6,692,355 | B2 | 2/2004 | Baerlocher et al. |
| D487,582 | S | 3/2004 | McGahn |
| 6,702,675 | B2 | 3/2004 | Poole et al. |
| 6,712,693 | B1 | 3/2004 | Hettinger |
| 6,712,694 | B1 | 3/2004 | Nordman |
| 6,715,756 | B2 | 4/2004 | Inoue |
| 6,719,632 | B2 | 4/2004 | Palmer et al. |
| 6,722,981 | B2 | 4/2004 | Kaminkow et al. |
| 6,722,982 | B2 | 4/2004 | Kaminkow et al. |
| 6,726,204 | B2 | 4/2004 | Inoue |
| 6,733,386 | B2 | 5/2004 | Cuddy et al. |
| 6,758,750 | B2 | 7/2004 | Baerlocher et al. |
| 6,776,711 | B1 | 8/2004 | Baerlocher |
| 6,786,820 | B2 | 9/2004 | Gerrard et al. |
| 6,793,579 | B2 | 9/2004 | Baerlocher et al. |
| 6,796,901 | B2 | 9/2004 | Baerlocher |
| 6,796,905 | B2 | 9/2004 | Baerlocher et al. |
| 6,802,778 | B1 | 10/2004 | Lemay et al. |
| 6,808,452 | B2 | 10/2004 | Baerlocher et al. |
| 6,808,454 | B2 | 10/2004 | Gerrard et al. |
| 6,811,483 | B1 | 11/2004 | Webb et al. |
| 6,811,485 | B2 | 11/2004 | Kaminkow |
| 6,832,957 | B2 | 12/2004 | Falconer |
| 6,852,030 | B2 | 2/2005 | Baerlocher |
| 6,855,056 | B2 | 2/2005 | Inoue |
| 6,857,958 | B2 | 2/2005 | Osawa |
| 6,866,583 | B2 | 3/2005 | Glavich et al. |
| 6,869,357 | B2 | 3/2005 | Adams |
| D504,473 | S | 4/2005 | Baerlocher |
| 6,875,108 | B1 | 4/2005 | Hughs-Baird |
| 6,880,826 | B2 | 4/2005 | Inoue |
| 6,890,257 | B2 | 5/2005 | Baerlocher |
| 6,893,018 | B2 | 5/2005 | Inoue |
| 6,896,617 | B2 | 5/2005 | Daly |
| 6,899,623 | B2 | 5/2005 | Baerlocher |
| 6,905,406 | B2 | 6/2005 | Kaminkow et al. |
| 6,942,566 | B2 | 9/2005 | Baerlocher et al. |
| 6,942,567 | B2 | 9/2005 | Baerlocher et al. |
| 6,960,132 | B2 | 11/2005 | Baerlocher et al. |
| 6,960,133 | B1 | 11/2005 | Marks et al. |
| 6,966,833 | B2 | 11/2005 | Kaminkow et al. |
| 6,971,953 | B2 | 12/2005 | Gerrard et al. |
| 6,971,955 | B2 | 12/2005 | Baerlocher et al. |
| 6,979,263 | B2 | 12/2005 | Baerlocher et al. |
| 7,001,273 | B2 | 2/2006 | Baerlocher |
| 7,001,274 | B2 | 2/2006 | Baerlocher et al. |
| 7,014,560 | B2 | 3/2006 | Glavich et al. |
| 7,029,395 | B1 | 4/2006 | Baerlocher |
| 7,040,984 | B2 | 5/2006 | Mead |
| 7,108,602 | B2 | 9/2006 | Daly |
| 7,131,908 | B2 | 11/2006 | Baerlocher |
| 7,160,186 | B2 | 1/2007 | Cuddy et al. |
| 7,172,506 | B2 | 2/2007 | Baerlocher et al. |
| 7,192,349 | B2 | 3/2007 | Baerlocher et al. |
| 7,198,569 | B2 | 4/2007 | Wolf et al. |
| 7,235,010 | B2 | 6/2007 | Baerlocher |
| 7,241,220 | B2 | 7/2007 | Rothkranz et al. |
| 7,250,001 | B2 | 7/2007 | Baerlocher et al. |
| 7,264,545 | B2 | 9/2007 | Maya et al. |
| 7,270,604 | B2 | 9/2007 | Gerrard et al. |
| 7,275,989 | B2 | 10/2007 | Moody |
| 7,326,114 | B2 | 2/2008 | Webb et al. |
| 7,329,179 | B2 | 2/2008 | Baerlocher |
| 7,331,864 | B2 | 2/2008 | Baerlocher |
| 7,364,507 | B2 | 4/2008 | Baerlocher et al. |
| 7,393,278 | B2 | 7/2008 | Gerson et al. |

(56) References Cited

U.S. PATENT DOCUMENTS 7,407,435 B2 8/2008 Baerlocher et al.
7,419,429 B2 9/2008 Taylor
7,470,184 B2 12/2008 Baerlocher et al.
7,507,155 B2 3/2009 Mead et al.
7,566,271 B2 7/2009 Hostetler et al.
7,601,062 B2 10/2009 Cole et al.
7,654,895 B2 2/2010 Pacey
7,731,582 B2 6/2010 Randall et al.
7,753,773 B2 7/2010 Baerlocher et al.
7,806,760 B2 10/2010 Baerlocher
7,914,373 B2 3/2011 Webb et al.
7,914,376 B2 3/2011 Walker et al.
7,918,725 B2 4/2011 Baerlocher
7,922,573 B2 4/2011 Baerlocher et al.
7,927,204 B2 4/2011 Debrabander, Jr. et al.
7,950,994 B2 5/2011 Berman et al.
2001/0054794 A1 12/2001 Cole et al.
2002/0025844 A1 2/2002 Casey et al.
2002/0025846 A1* 2/2002 Bennett et al. .................. 463/20
2002/0045475 A1 4/2002 Glavich et al.
2002/0055382 A1 5/2002 Meyer
2002/0072402 A1 6/2002 Baerlocher
2002/0094857 A1 7/2002 Meyer
2002/0094861 A1 7/2002 Seelig et al.
2002/0094862 A1 7/2002 Inoue
2002/0142822 A1 10/2002 Baerlocher et al.
2002/0142829 A1 10/2002 Inoue
2002/0151350 A1 10/2002 Baerlocher et al.
2002/0155883 A1 10/2002 Baerlocher
2002/0187827 A1 12/2002 Blankstein
2002/0193158 A1 12/2002 Weiss et al.
2002/0193160 A1 12/2002 Tarantino
2003/0013514 A1 1/2003 Cregan et al.
2003/0013518 A1 1/2003 Graham
2003/0017865 A1 1/2003 Beaulieu et al.
2003/0027622 A1 2/2003 Osawa
2003/0036419 A1 2/2003 Baerlocher et al.
2003/0036422 A1 2/2003 Baerlocher et al.
2003/0036424 A1 2/2003 Baerlocher
2003/0040355 A1 2/2003 Baerlocher
2003/0040360 A1 2/2003 Kaminkow
2003/0045344 A1 3/2003 Webb et al.
2003/0045345 A1 3/2003 Berman
2003/0045348 A1 3/2003 Palmer et al.
2003/0045350 A1 3/2003 Baerlocher et al.
2003/0060260 A1 3/2003 Gerrard et al.
2003/0064795 A1 4/2003 Baerlocher et al.
2003/0078093 A1 4/2003 Simms et al.
2003/0087693 A1 5/2003 Baerlocher et al.
2003/0092480 A1 5/2003 White et al.
2003/0157982 A1 8/2003 Gerrard et al.
2003/0162579 A1 8/2003 Gauselmann
2003/0162584 A1 8/2003 Hughs-Baird et al.
2003/0203752 A1 10/2003 Kaminkow et al.
2003/0207713 A1 11/2003 Taylor
2003/0216165 A1 11/2003 Singer et al.
2003/0232643 A1 12/2003 Inoue
2004/0000754 A1 1/2004 Inoue
2004/0009803 A1 1/2004 Bennett et al.
2004/0009805 A1 1/2004 Baerlocher et al.
2004/0012145 A1 1/2004 Inoue
2004/0014516 A1 1/2004 Inoue
2004/0014517 A1 1/2004 Inoue
2004/0017041 A1 1/2004 Inoue
2004/0018866 A1 1/2004 Inoue
2004/0023707 A1 2/2004 Maya et al.
2004/0023713 A1 2/2004 Wolf et al.
2004/0023714 A1 2/2004 Asdale
2004/0023715 A1 2/2004 Luciano, Jr. et al.
2004/0026854 A1 2/2004 Inoue
2004/0036218 A1 2/2004 Inoue
2004/0038724 A1 2/2004 Asdale
2004/0038726 A1 2/2004 Inoue
2004/0038729 A1 2/2004 Webb et al.
2004/0041340 A1 3/2004 Inoue
2004/0048650 A1 3/2004 Mierau et al.
2004/0053658 A1 3/2004 Rothranz
2004/0053687 A1 3/2004 Nordman et al.
2004/0058727 A1 3/2004 Marks et al.
2004/0097280 A1 5/2004 Gauselmann
2004/0106444 A1 6/2004 Cuddy et al.
2004/0121840 A1 6/2004 Rosander et al.
2004/0155399 A1 8/2004 Inoue
2004/0162128 A1 8/2004 Baerlocher et al.
2004/0180710 A1 9/2004 Palmer et al.
2004/0183251 A1 9/2004 Inoue
2004/0185928 A1 9/2004 Baerlocher et al.
2004/0192431 A1 9/2004 Singer et al.
2004/0195773 A1 10/2004 Masci et al.
2004/0214628 A1 10/2004 Boyd et al.
2004/0214632 A1 10/2004 Cuddy et al.
2004/0242313 A1 12/2004 Munoz
2004/0242314 A1 12/2004 Casey
2005/0009596 A1* 1/2005 Daly ............................... 463/20
2005/0009597 A1 1/2005 Daly
2005/0020342 A1 1/2005 Palmer et al.
2005/0020346 A1 1/2005 Baerlocher
2005/0032567 A1 2/2005 Baerlocher et al.
2005/0037829 A1 2/2005 Baerlocher et al.
2005/0043083 A1 2/2005 Inoue
2005/0043084 A1 2/2005 Inoue
2005/0049036 A1 3/2005 Mead
2005/0054413 A1 3/2005 Randall et al.
2005/0054416 A1 3/2005 Hostetler et al.
2005/0054429 A1 3/2005 Baerlocher et al.
2005/0055115 A1 3/2005 Gerrard et al.
2005/0059477 A1 3/2005 Baerlocher
2005/0059478 A1 3/2005 Peterson et al.
2005/0060050 A1 3/2005 Baerlocher
2005/0071023 A1 3/2005 Gilliland et al.
2005/0096121 A1 5/2005 Gilliland et al.
2005/0096123 A1 5/2005 Cregan et al.
2005/0101375 A1 5/2005 Webb et al.
2005/0124406 A1 6/2005 Cannon
2005/0130729 A1 6/2005 Baerlocher et al.
2005/0143170 A1 6/2005 Maya et al.
2005/0159208 A1* 7/2005 Pacey .............................. 463/20
2005/0164774 A1 7/2005 Gauselmann
2005/0164777 A1 7/2005 Daly
2005/0187010 A1 8/2005 Baerlocher
2005/0192081 A1 9/2005 Marks et al.
2005/0197180 A1 9/2005 Kaminkow et al.
2005/0208992 A1 9/2005 Randall
2005/0266914 A1 12/2005 Baerlocher et al.
2005/0277460 A1 12/2005 Inoue
2005/0282620 A1 12/2005 Marks et al.
2005/0282625 A1 12/2005 Nicely
2005/0288094 A1 12/2005 Marks et al.
2006/0003837 A1 1/2006 Baerlocher et al.
2006/0019738 A1 1/2006 Baerlocher et al.
2006/0025196 A1 2/2006 Webb et al.
2006/0040728 A1 2/2006 Fuller
2006/0040827 A1 2/2006 Rajamannan
2006/0046830 A1 3/2006 Webb
2006/0063580 A1 3/2006 Nguyen et al.
2006/0073872 A1 4/2006 B-Jensen et al.
2006/0084492 A1 4/2006 Baerlocher et al.
2006/0084498 A1* 4/2006 Baerlocher et al. ............. 463/20
2006/0111176 A1 5/2006 Kaminkow et al.
2006/0116196 A1 6/2006 Vancura
2006/0121966 A1 6/2006 Baerlocher
2006/0128457 A1 6/2006 Cannon
2006/0172791 A1 8/2006 Wolf
2007/0021182 A1 1/2007 Gauselmann
2007/0060246 A1 3/2007 Baerlocher et al.
2007/0087804 A1 4/2007 Knowles et al.
2007/0135207 A1 6/2007 Tarantino
2007/0155466 A1 7/2007 Baerlocher et al.
2007/0243921 A1 10/2007 Fanjoy et al.
2007/0275778 A1 11/2007 Fong et al.
2007/0287532 A1 12/2007 Jackson
2007/0298872 A1 12/2007 Gerrard et al.
2008/0039184 A1 2/2008 Inamura
2008/0058090 A1 3/2008 Okada

(56) References Cited

U.S. PATENT DOCUMENTS

| | | | | |
|---|---|---|---|---|
| 2008/0076503 | A1 | 3/2008 | Mattice et al. | |
| 2008/0076535 | A1 | 3/2008 | Baerlocher et al. | |
| 2008/0090636 | A1 | 4/2008 | Lathrop | |
| 2008/0102923 | A1 | 5/2008 | Esses et al. | |
| 2008/0132309 | A1 * | 6/2008 | Baumgartner et al. | 463/16 |
| 2008/0161094 | A1 * | 7/2008 | Tempest et al. | 463/20 |
| 2008/0214272 | A1 | 9/2008 | Baerlocher et al. | |
| 2008/0214292 | A1 | 9/2008 | Bryant et al. | |
| 2009/0042652 | A1 | 2/2009 | Baerlocher et al. | |
| 2009/0088239 | A1 | 4/2009 | Iddings et al. | |
| 2009/0104979 | A1 | 4/2009 | Ruymann | |
| 2009/0227357 | A1 | 9/2009 | Rasmussen | |
| 2010/0016055 | A1 | 1/2010 | Englman | |
| 2010/0304831 | A1 | 12/2010 | Suda et al. | |
| 2010/0331072 | A1 * | 12/2010 | Wiryadi | 463/20 |
| 2011/0045894 | A1 | 2/2011 | Owen | |
| 2011/0111824 | A1 | 5/2011 | Cuddy et al. | |
| 2011/0190044 | A1 | 8/2011 | Berman et al. | |
| 2012/0184347 | A1 * | 7/2012 | Freele | 463/20 |
| 2012/0258787 | A1 * | 10/2012 | Bennett | 463/21 |
| 2013/0053124 | A1 * | 2/2013 | Masen et al. | 463/20 |
| 2013/0252699 | A1 * | 9/2013 | Nauman et al. | 463/20 |
| 2014/0094248 | A1 * | 4/2014 | Vancura | 463/20 |

* cited by examiner

100

GAMING SYSTEM AND METHOD PROVIDING A SLOT GAME EMPLOYING A RANDOMLY SELECTED SET OF REELS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming systems that provide players awards in primary or base games are well known. These gaming systems generally require a player to place a wager to activate a play of the primary game. For many of these gaming systems, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming systems, an amount of a wager placed on a primary game by a player may vary. For instance, a gaming system may enable a player to wager a minimum quantity of credits, such as one credit (where one credit represents a unit of monetary currency such as one penny, nickel, dime, quarter, or dollar or a unit of virtual currency such as one virtual coin, virtual casino chip, player point, loyalty point, or cross-game point), up to a maximum quantity of credits, such as five credits. The gaming system may enable the player to place this wager a single time or multiple times for a single play of the primary game. For instance, a gaming system configured to operate a slot game may have one or more paylines, and the gaming system may enable a player to place a wager on each of the paylines for a single play of the slot game. Thus, it is known that a gaming system, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Bonus or secondary games are also known in gaming systems. Such gaming systems usually provide an award to a player for a play of one such bonus game in addition to any awards provided for any plays of any primary games. Bonus games usually do not require an additional wager to be placed by the player to be initiated. Bonus games are typically initiated or triggered upon an occurrence of a designated triggering symbol or designated triggering symbol combination in the primary game. For instance, a gaming machine may initiate or trigger a bonus game when a bonus symbol occurs on the payline on the third reel of a three reel slot machine. The gaming systems generally indicates when a bonus game is initiated or triggered through one or more visual and/or audio output devices, such as the reels, lights, speakers, display screens, etc. Part of the enjoyment and excitement of playing certain gaming systems is the initiation or triggering of a bonus game, even before the player knows an amount of a bonus award won via the bonus game.

Various players continually seek out new and different variations to gaming systems. A continuing need thus exists for gaming systems and methods that provide new, exciting, and engaging games.

SUMMARY

Various embodiments of the present disclosure are directed to a gaming system and method providing a slot game employing a set of randomly selected reels. Generally, the gaming system is configured to sequentially display a plurality of adjacently-arranged reels and any indicators associated with certain feature-enhanced reels, and to select a subset of those reels to employ for a play of the slot game.

More specifically, in one embodiment, the gaming system is configured to operate a slot game associated with a plurality of adjacently arranged reels including a plurality of symbols. Each of a plurality of the reels is associated with one of a plurality of different features and an indicator representing that feature. The gaming system initiates a play of the slot game; begins sequentially displaying the reels; and, for each of the plurality of the reels, displays the corresponding indicator in association with that reel if and when that reel is displayed. The gaming system selects a set of two or more of the reels, wherein each of the selected reels is adjacent to at least one of the other selected reels.

The gaming system stops sequentially displaying the reels such that the selected reels are displayed in association with a plurality of symbol display areas. The gaming system generates and displays a plurality of the symbols on the selected reels at the symbol display areas. The gaming system determines whether any of a plurality of different winning symbol combinations are displayed. The gaming system determines any awards associated with any displayed winning symbol combinations and displays and provides any determined awards.

In various embodiments, the slot game is associated with a predetermined number of reels that are adjacently arranged in a predetermined order or sequence in which the gaming system displays the reels. In other embodiments, the slot game is associated with a predetermined initial set of reels adjacently arranged in an initial predetermined order, and the gaming system dynamically adds one or more additional reels to the initial set during game play. In further embodiments, the gaming system dynamically generates the plurality of adjacently-arranged reels during game play.

It should thus be appreciated that the gaming system and method of the present disclosure incorporate new and different ways of determining which reels to employ for a play of a slot game, thereby increasing player enjoyment, entertainment, and excitement.

Additional features and advantages are described herein, and will be apparent from, the following Detailed Description and the Figures.

DETAILED DESCRIPTION

Slot Game Employing a Randomly Selected Set of Reels

Various embodiments of the present disclosure are directed to a gaming system and method providing a slot game employing a randomly selected set of reels. While the slot game of the present disclosure is a primary game in the embodiments described below, it should be appreciated that the slot game may additionally or alternatively be employed as or in association with a secondary game or a bonus game. Moreover, while the credit balances, the wagers, and the awards are displayed as an amount of monetary credits or currency in the embodiments described below, one or more of such credit balances, such wagers, and such awards may be for non-monetary credits, promotional credits, and/or player tracking points or credits.

Figure 1:
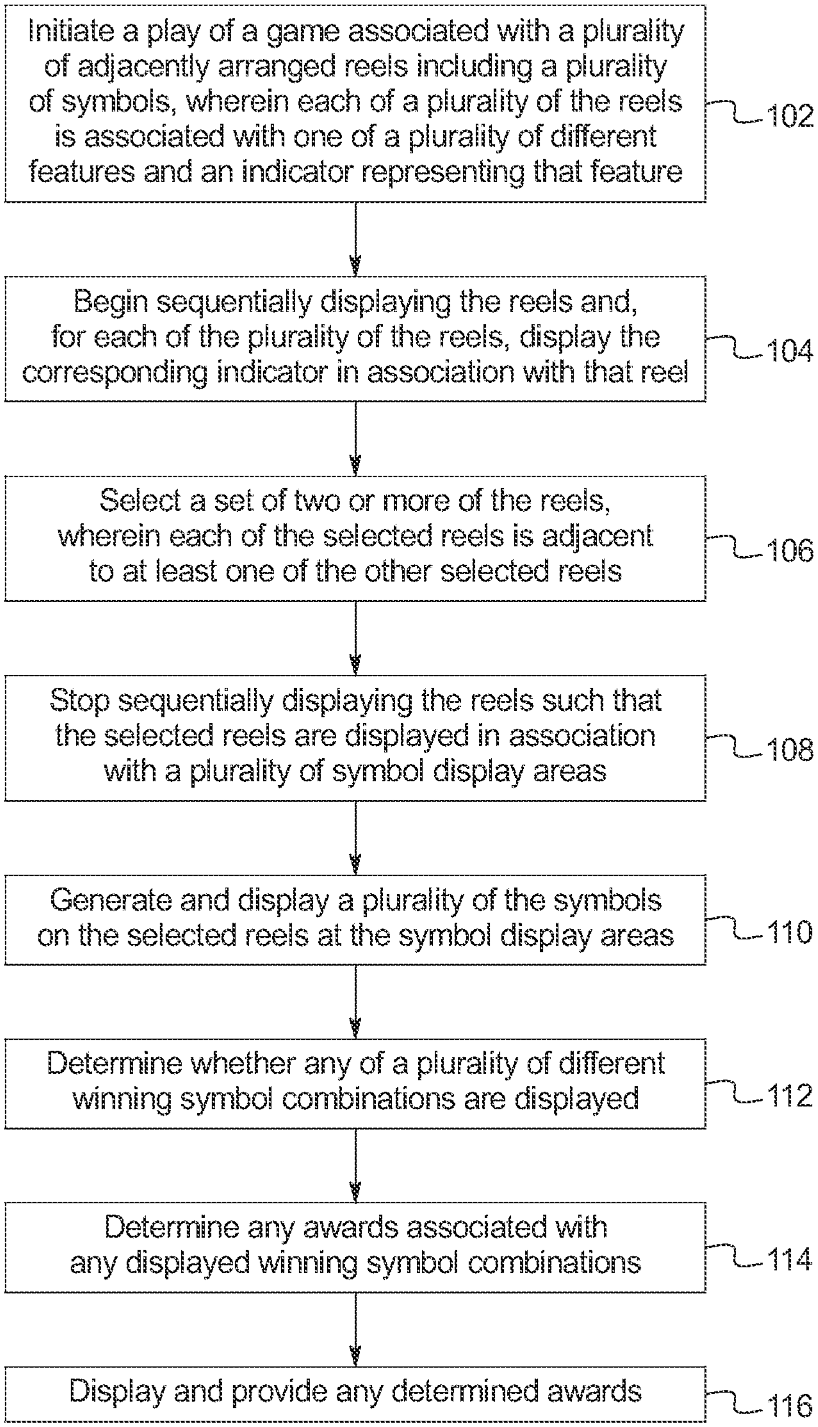
FIG. 1 is a flowchart illustrating a method of operating an example embodiment of the gaming system of the present disclosure.

FIG. 1 illustrates a flowchart of an example process or method 100 of operating the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks may be changed, certain of the illustrated blocks may be optional, and/or certain of the illustrated blocks may not be employed.

In this example, the gaming system is configured to operate a slot game associated with a plurality of adjacently arranged reels including a plurality of symbols. Each of a plurality of the reels is associated with one of a plurality of different features and an indicator representing that feature. The gaming system initiates a play of the slot game, as indicated by block 102. The gaming system begins sequentially displaying the reels and, for each of the plurality of the reels, displays the corresponding indicator in association with that reel if and when that reel is displayed, as indicated by block 104. The gaming system selects a set of two or more of the reels, wherein each of the selected reels is adjacent to at least one of the other selected reels, as indicated by block 106.

The gaming system stops sequentially displaying the reels such that the selected reels are displayed in association with a plurality of symbol display areas, as indicated by block 108. The gaming system generates and displays a plurality of the symbols on the selected reels at the symbol display areas, as indicated by block 110. The gaming system determines whether any of a plurality of different winning symbol combinations are displayed, as indicated by block 112. The gaming system determines any awards associated with any displayed winning symbol combinations, as indicated by block 114, and displays and provides any determined awards, as indicated by block 116.

In various embodiments, the slot game is associated with a predetermined number of predetermined reels that are adjacently arranged in a predetermined order or sequence. In operation of such embodiments, the gaming system sequentially displays the reels according to the predetermined order until the gaming system selects the set of the reels and subsequently stops sequentially displaying the reels such that the selected reels are displayed in association with the symbol display areas. In these embodiments, if the gaming system has sequentially displayed all of the reels before selecting the set of the reels and stopping the sequential display of the reels accordingly, the gaming system repeats the sequential display of the reels according to the predetermined order until the gaming system selects the set of the reels and subsequently stops sequentially displaying the reels such that the selected reels are displayed in association with the symbol display areas. In other words, the gaming system sequentially displays the reels according to the predetermined order in a "wrap-around" manner. For example, if the slot game is associated with the following eight predetermined reels arranged in the following predetermined order—A, B, C, D, E, F, G, and H—for a play of the slot game the gaming system sequentially displays those reels (if necessary) as follows: A, B, C, D, E, F, G, H, A, B, C, D, E, F, G, H, A, B, C, and so on until the gaming system selects a set of the reels and subsequently stops sequentially displaying the reels such that the selected reels are displayed in association with the symbol display areas.

FIGS. 2A, 2B, 2C, 2D, and 2E illustrate screen shots an example of one such embodiment of the slot game of the present disclosure. In this example, the slot game is associated with, and gaming system displays (such as on a display device 1116 or 1118, described below), a predetermined number of thirteen predetermined reels adjacently arranged in the following predetermined order: reel 210*a*, reel 210*b*, reel 210*c*, reel 210*d*, reel 210*e*, reel 210*f*, reel 210*g*, reel 210*h*, reel 210*i*, reel 210*j*, reel 210*k*, reel 210*l*, and reel 210*m*. In this example, although the gaming system displays the reels such that reel 210*a* and reel 210*m* are separated from one another, in operation, reels 210*a* and 210*m* are adjacent to one another such that reel 210*a* follows reel 210*m* as the reels scroll from right to left (as described below).

A plurality of the reels—reel 210*b* and reel 210*k* in this example—are each associated with a different feature. In this example, reel 210*b* is associated with a wild reel feature such that when reel 210*b* stops spinning, the gaming system displays all Wild symbols on reel 210*b*. In other words, in this example, if the gaming system selects to employ reel 210*b* for the play of the slot game, reel 210*b* is guaranteed to display all Wild symbols for the play of the slot game. Reel 210*k* is associated with a bonus trigger feature such that certain of the symbols on reel 210*k* are bonus trigger symbols that, if generated and displayed as a result of the play of the slot game, trigger a play of a bonus game. Each of the plurality of the reels is associated with an indicator representing the feature with which that reel is associated. In this example, the indicators representing the different features are different from one another. Here, reel 210*b* is associated with a first indicator representing the wild reel feature, and reel 210*k* is associated with a second different indicator representing the bonus trigger feature.

It should be appreciated that, in other embodiments, only one of the reels is associated with such a feature, and that, in further embodiments, any suitable number of reels are each associated with such a feature. In certain embodiments, at least one of the reels is not associated with such a feature, while in other embodiments each of the reels is associated with at least one such feature. In various embodiments, at least one reel is associated with a plurality of different features.

The gaming system displays a reel set indicator 205, which includes a plurality of symbol display areas 220*a*, 220*b*, 220*c*, 220*d*, 220*e*, 220*f*, 220*g*, 220*h*, 220*i*, 220*j*, 220*k*, 220*l*, 220*m*, 220*n*, and 220*o* arranged in a 3×5 matrix. For a play of the slot game, as described in detail below, reel set indicator 205 is configured to indicate the set of adjacent reels that the gaming system selects to employ for the play of the slot game. The gaming system also displays a plurality of paylines for the slot game. Each of the paylines is associated with a different plurality of the symbol display areas. In this example, payline 215*a* is associated with symbol display areas 210*a*, 210*b*, 210*c*, 210*d*, and 210*e*; payline 215*b* is associated with symbol display areas 210*f*, 210*g*, 210*h*, 210*i*, and 210*j*; and payline 215*c* is associated with symbol display areas 210*k*, 210*l*, 210*m*, 210*n*, and 210*o*.

The gaming system displays a plurality of displays or meters, including: a credit meter 214 that displays the player's credit balance; a wager display 216 that displays any wagers placed on a play of the slot game; an award display 218 that displays any awards won for a play of the slot game; and a message box 212 that displays messages or indications before, during, or after play of the slot game. While in this illustrated example the gaming system indicates the player's credit balance, the player's wager, and any awards provided to the player in the form of amounts of credits, it should be appreciated that such indications may alternatively or additionally be made in the form of amounts of currency.

Figure 2A:
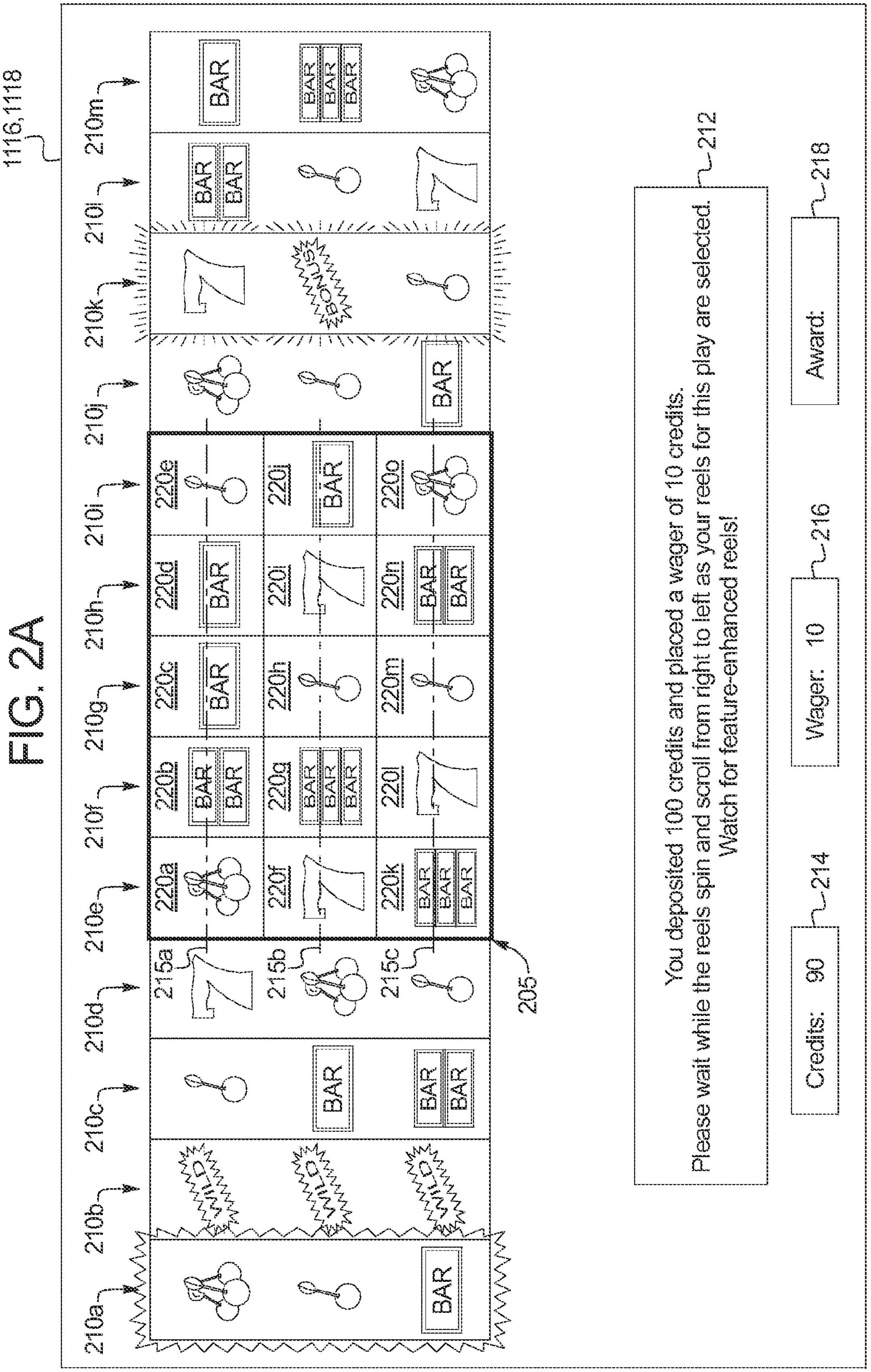
FIGS. 2A, 2B, 2C, 2D, and 2E illustrate screen shots of an example embodiment of the gaming system of the present disclosure configured to operate an example of the slot game of the present disclosure in which the slot game is associated with a predetermined number of predetermined reels that are adjacently arranged in a predetermined order.

As illustrated in FIG. 2A, the gaming system receives value, such as currency (or its equivalent), from a player. In this example, the gaming system provides the player 100 credits, which represents the received value. The gaming system subsequently receives a wager of 10 credits from the player for a play of the slot game. The gaming system displays the player's wager of 10 credits in wager display 216. The gaming system displays the player's total remaining credit balance of 90 credits (i.e., the player's initial credit balance of 100 credits minus the player's wager of 10 credits) in credit meter 214. The gaming system displays the following message in message box 212: "YOU DEPOSITED 100 CREDITS AND PLACED A WAGER OF 10 CREDITS. PLEASE WAIT WHILE THE REELS SPIN AND SCROLL FROM RIGHT TO LEFT AS YOUR REELS FOR THIS PLAY ARE SELECTED. WATCH FOR FEATURE-ENHANCED REELS!"

Figure 2B:
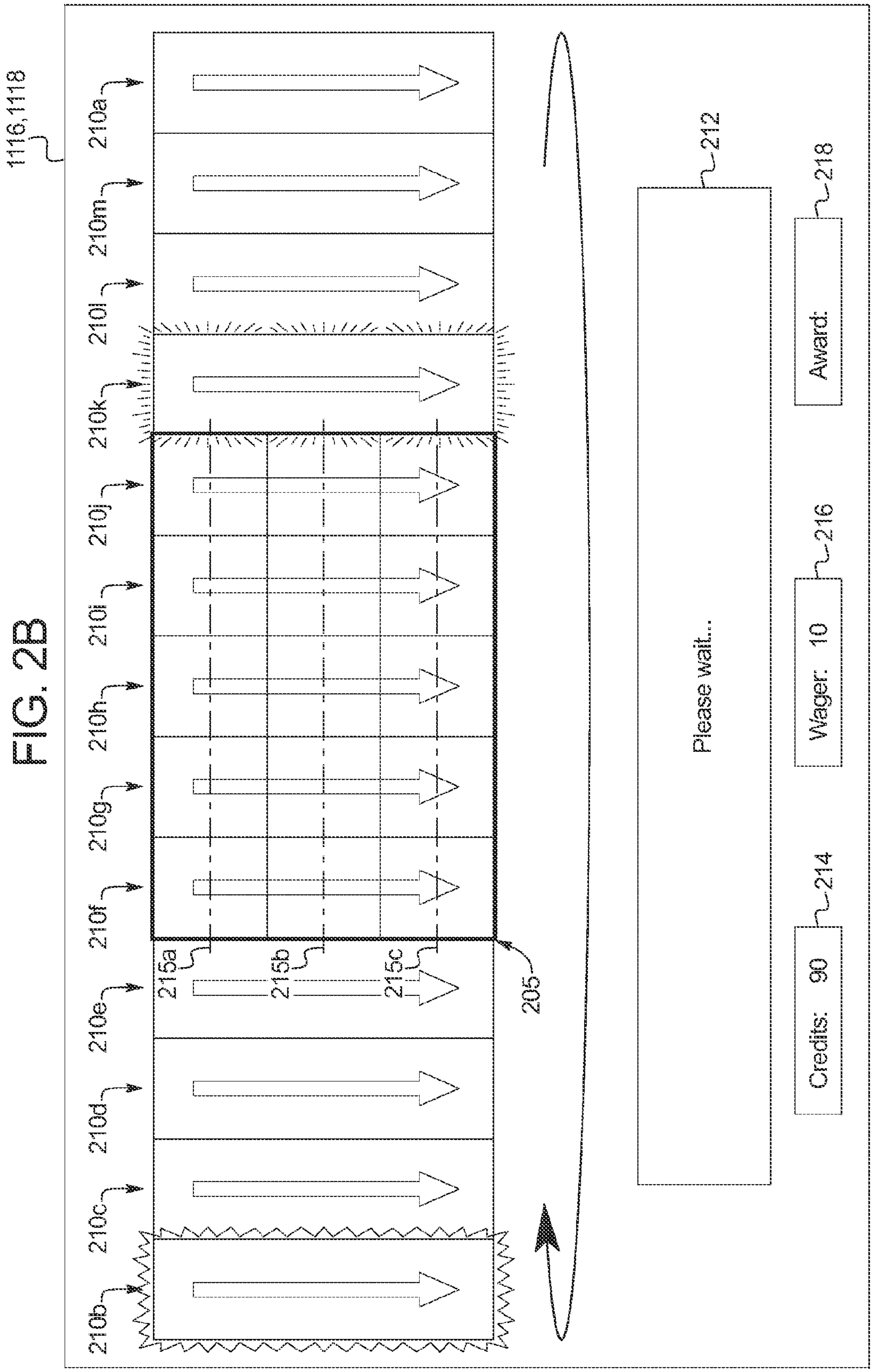

As illustrated in FIG. 2B, in this example, upon initiation of the play of the slot game, the gaming system displays each of the reels spinning. The gaming system sequentially displays the reels scrolling from right to left according to the predetermined order through reel set indicator 205. In other embodiments, the gaming system sequentially displays the reels scrolling from left to right, top to bottom, bottom to top, diagonally, or in any other suitable direction or combination of directions rather than from right to left. As shown in FIG. 2B, the reels have scrolled from right to left such that reel 210*b* is the leftmost reel and reel 210*a* is the rightmost reel. As the reels continue scrolling, the gaming system displays the following message in message box 212: "PLEASE WAIT . . . "

In this embodiment, the gaming system displays all of or at least a portion of all of the reels associated with the slot game (i.e., the predetermined number of thirteen reels in this illustrated example) at each point in time during play of the slot game. In other embodiments, however, the gaming system displays fewer than all of the reels or the portions thereof associated with the slot game at each point in time during play of the slot game. For instance, in an example in which the slot game is associated with 200 reels, the gaming system displays a subset of those 200 reels at each point in time during play of the slot game. In one such embodiment, at each point in time during play of the slot game, the gaming system only displays reels (or portions thereof) displayed within the reel set indicator.

Figure 2C:
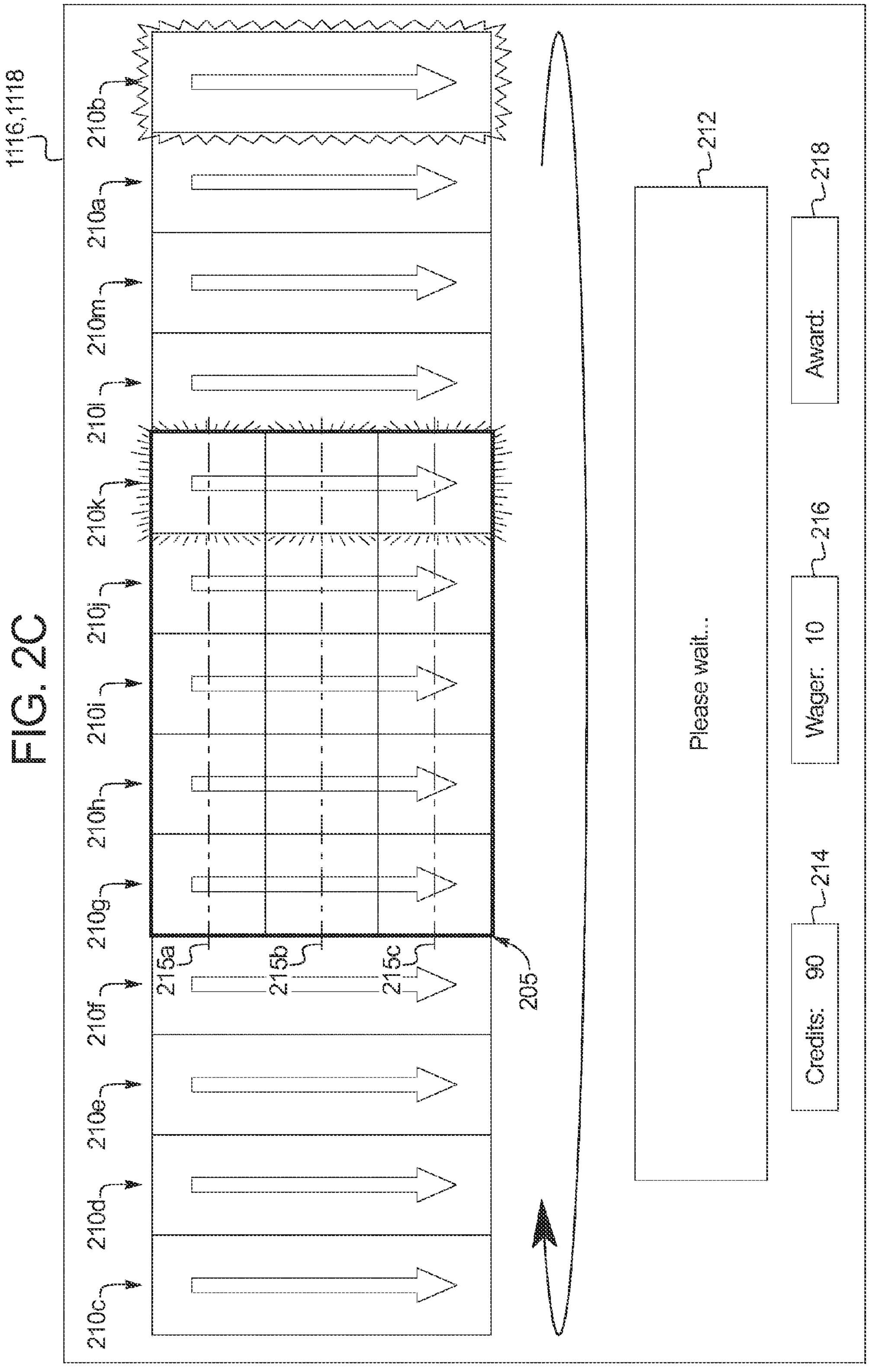

As illustrated in FIG. 2C, after further scrolling from right to left, reel 210*c* is the leftmost reel and reel 210*b* is the rightmost reel. As the reels continue scrolling, the gaming system displays the following message in message box 212: "PLEASE WAIT . . . "

Figure 2D:
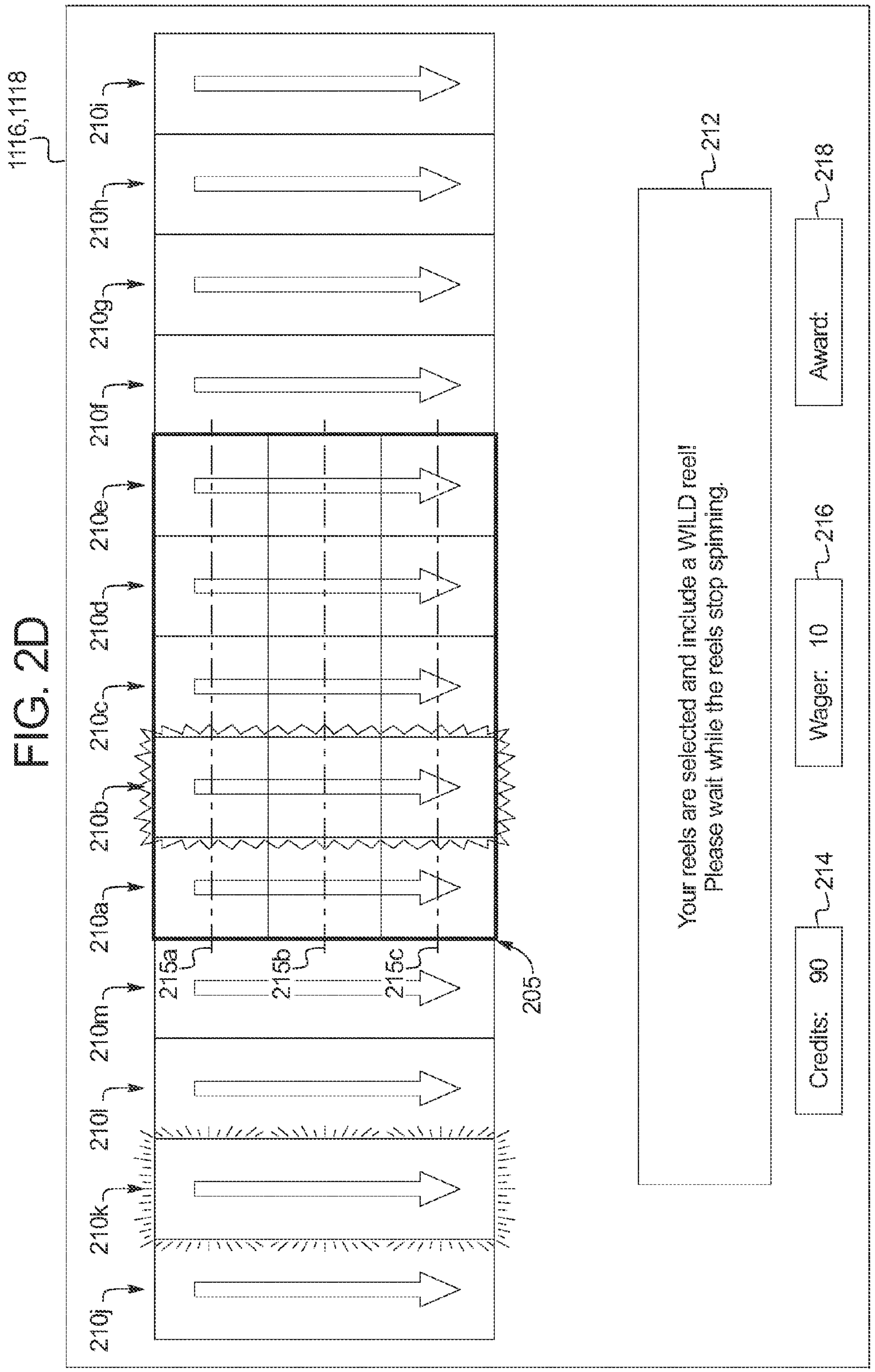

The gaming system randomly selects a set of five of the reels, wherein each of the selected reels is adjacent to at least one of the other selected reels. In this example, the gaming system selects reels 210*a*, 210*b*, 210*c*, 210*d*, and 210*e*. As illustrated in FIG. 2D, the gaming system stops sequentially displaying the reels such that the selected reels are displayed in reel set indicator 205 and in association with the symbol display areas. The gaming system displays the following message in message box 212: "YOUR REELS ARE SELECTED AND INCLUDE A WILD REEL! PLEASE WAIT WHILE THE REELS STOP SPINNING." In this illustrated example, once the gaming system stops sequentially displaying the reels such that the selected reels are displayed in association with the symbol display areas, the gaming system grays out; crosses out; dims; stops displaying (i.e., removes such reels from the display device); or otherwise indicates that the non-selected reels are not being used for the remainder of the play of the slot game. It should be appreciated that, in other embodiments, the gaming system does not do so. It should also be appreciated that, in other embodiments, the gaming system highlights, brightens, or otherwise emphasizes the selected reels.

Any suitable amount of time may elapse between the time the gaming system begins sequentially displaying the reels and the time the gaming system stops sequentially displaying the reels. It should be appreciated that the amount of time that elapses between the time the gaming system begins sequentially displaying the reels and the time the gaming system stops sequentially displaying the reels may be predetermined or determined in any suitable manner(s) and/or based on any suitable factor(s).

Figure 2E:
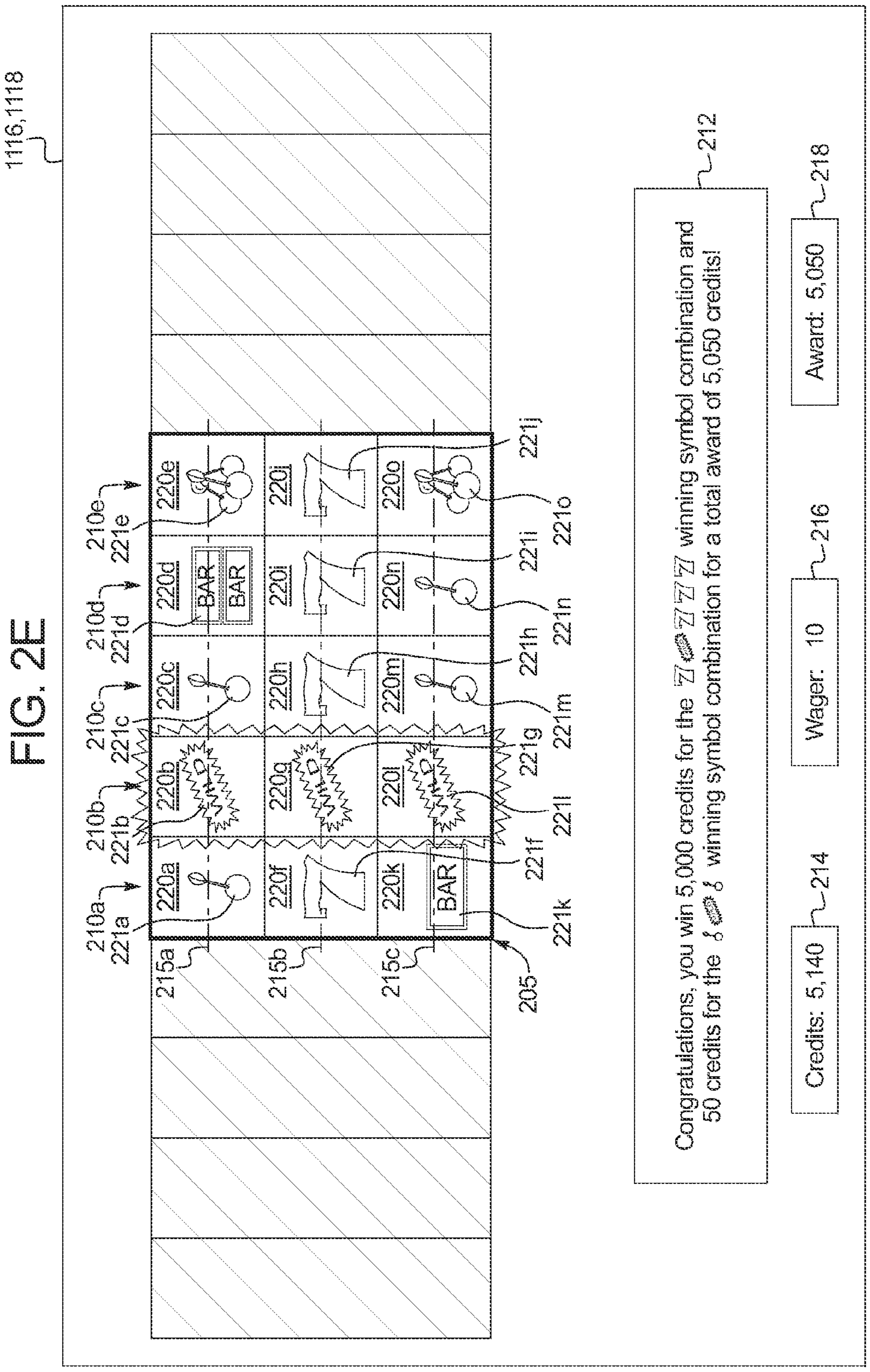

As illustrated in FIG. 2E, the gaming system generates and displays a plurality of the symbols on the selected reels at the symbol display areas. Specifically, in this illustrated example, the gaming system generates and displays: Cherry symbol 221$a$ at symbol display area 220$a$, Wild symbol 221$b$ at symbol display area 220$b$, Cherry symbol 221$c$ at symbol display area 220$c$, Double Bar symbol 221$d$ at symbol display area 220$d$, Triple Cherry symbol 221$e$ at symbol display area 220$e$, Seven symbol 221$f$ at symbol display area 220$f$, Wild symbol 221$g$ at symbol display area 220$g$, Seven symbol 221$h$ at symbol display area 220$h$, Seven symbol 221$i$ at symbol display area 220$i$, Seven symbol 221$j$ at symbol display area 220$j$, Bar symbol 221$k$ at symbol display area 220$k$, Wild symbol 221$l$ at symbol display area 220$l$, Cherry symbol 221$m$ at symbol display area 220$m$, Cherry symbol 221$n$ at symbol display area 220$n$, and Triple Cherry symbol 221$o$ at symbol display area 220$o$.

The gaming system makes an award determination based on the displayed symbols. More specifically, the gaming system determines whether the displayed symbols form any of a plurality of different winning symbol combinations along paylines 210$a$, 210$b$, and/or 210$c$. In this example, the gaming system determines an award of 50 credits associated with the Cherry-Wild-Cherry winning symbol combination (which acts as a Cherry-Cherry-Cherry winning symbol combination by virtue of the Wild symbol) formed by symbols 221$a$, 221$b$, and 221$c$ displayed along payline 210$a$. The gaming system also determines an award of 5,000 credits associated with the Seven-Wild-Seven-Seven-Seven winning symbol combination (which acts as a Seven-Seven-Seven-Seven-Seven winning symbol combination by virtue of the Wild symbol) displayed along payline 210$b$. The gaming system displays the total award of 5,050 credits in award display 218 and updates the player's credit balance indicated by credit meter 218 to 5,140 credits to reflect the 5,050 credit award. The gaming system displays the following message in message display 212 displays the following message: "CONGRATULATIONS, YOU WIN 5,000 CREDITS FOR THE 7-WILD-7-7-7 WINNING SYMBOL COMBINATION AND 50 CREDITS FOR THE CHERRY-WILD-CHERRY WINNING SYMBOL COMBINATION FOR A TOTAL AWARD OF 5,050 CREDITS!"

In other embodiments, the slot game is associated with an initial set of reels arranged in an initial order and dynamically adds one or more additional reels to the initial set during game play. In one such embodiment, the initial set of reels is predetermined and the gaming system selects any additional reels from a pool or bank including a plurality of reels. In another such embodiment, upon initiation of a play of the slot game, the gaming system randomly selects a plurality of the reels from the pool of reels to form the initial set of reels, and displays the initial set of reels adjacently arranged in an initial order or sequence. In this embodiment, the gaming system begins sequentially displaying the initial set of reels according to the initial order. If the gaming system has sequentially displayed all of the reels according to the initial order before stopping the sequential display, the gaming system selects an additional reel from the pool of reels to display following the final reel of the initial set. In this embodiment, the gaming system continues to select and display such additional reels until the gaming system selects a set of the reels and subsequently stops sequentially displaying the reels such that the selected reels are displayed in association with the symbol display areas. Thus, in this embodiment, the slot game is not associated with a predetermined number of predetermined reels that are adjacently arranged in a predetermined order. Rather, in this embodiment, the slot game is associated with an unknown number of reels, and the order in which the reels are adjacently arranged and displayed is dynamically determined by the gaming system during game play. Additionally, in this embodiment, the gaming system does not repeat the sequential display of the reels.

FIGS. 3A, 3B, 3C, 3D, and 3E illustrate screen shots an example of one such embodiment of the slot game of the present disclosure. In this example, the slot game is associated with, and the gaming system stores, a pool of a plurality of predetermined reels (not shown). Upon initiation of a play of the slot game (as described below) the gaming system selects an initial set of nine predetermined reels from the pool and displays the reels of the initial set as being adjacently arranged in the following order: reel 310$a$, reel 310$b$, reel 310$c$, reel 310$d$, reel 310$e$, reel 310$f$, reel 310$g$, reel 310$h$, and reel 310$i$.

Initially, one of the reels—reel 310$g$ in this example—is associated with a feature. In this example, reel 310$g$ is associated with a bonus trigger feature such that certain of the symbols on reel 310$g$ are bonus trigger symbols that, if generated and displayed for the play of the slot game, trigger a play of a bonus game. Reel 310$g$ is also associated with an indicator representing the bonus trigger feature.

The gaming system displays a reel set indicator 305, which includes a plurality of symbol display areas 320$a$, 320$b$, 320$c$, 320$d$, 320$e$, 320$f$, 320$g$, 320$h$, 320$i$, 320$j$, 320$k$, 320$l$, 320$m$, 320$n$, and 320$o$ arranged in a 3×5 matrix. For a play of the slot game, as described in detail below, reel set indicator 305 is configured to indicate the set of adjacent reels that the gaming system selects to employ for the play of the slot game. The gaming system also displays a plurality of paylines for the slot game. Each of the paylines is associated with a different plurality of the symbol display areas. In this example, payline 315$a$ is associated with symbol display areas 310$a$, 310$b$, 310$c$, 310$d$, and 310$e$; payline 315$b$ is associated with symbol display areas 310$f$, 310$g$, 310$h$, 310$i$, and 310$j$; and payline 315$c$ is associated with symbol display areas 310$k$, 310$l$, 310$m$, 310$n$, and 310$o$.

The gaming system displays a plurality of displays or meters, including: a credit meter 314 that displays the player's credit balance; a wager display 316 that displays any wagers placed on a play of the slot game; an award display 318 that displays any awards won for a play of the slot game; and a message box 312 that displays messages or indications before, during, or after play of the slot game. While in this illustrated example the gaming system indicates the player's credit balance, the player's wager, and any awards provided to the player in the form of amounts of credits, it should be appreciated that such indications may alternatively or additionally be made in the form of amounts of currency.

Figure 3A:
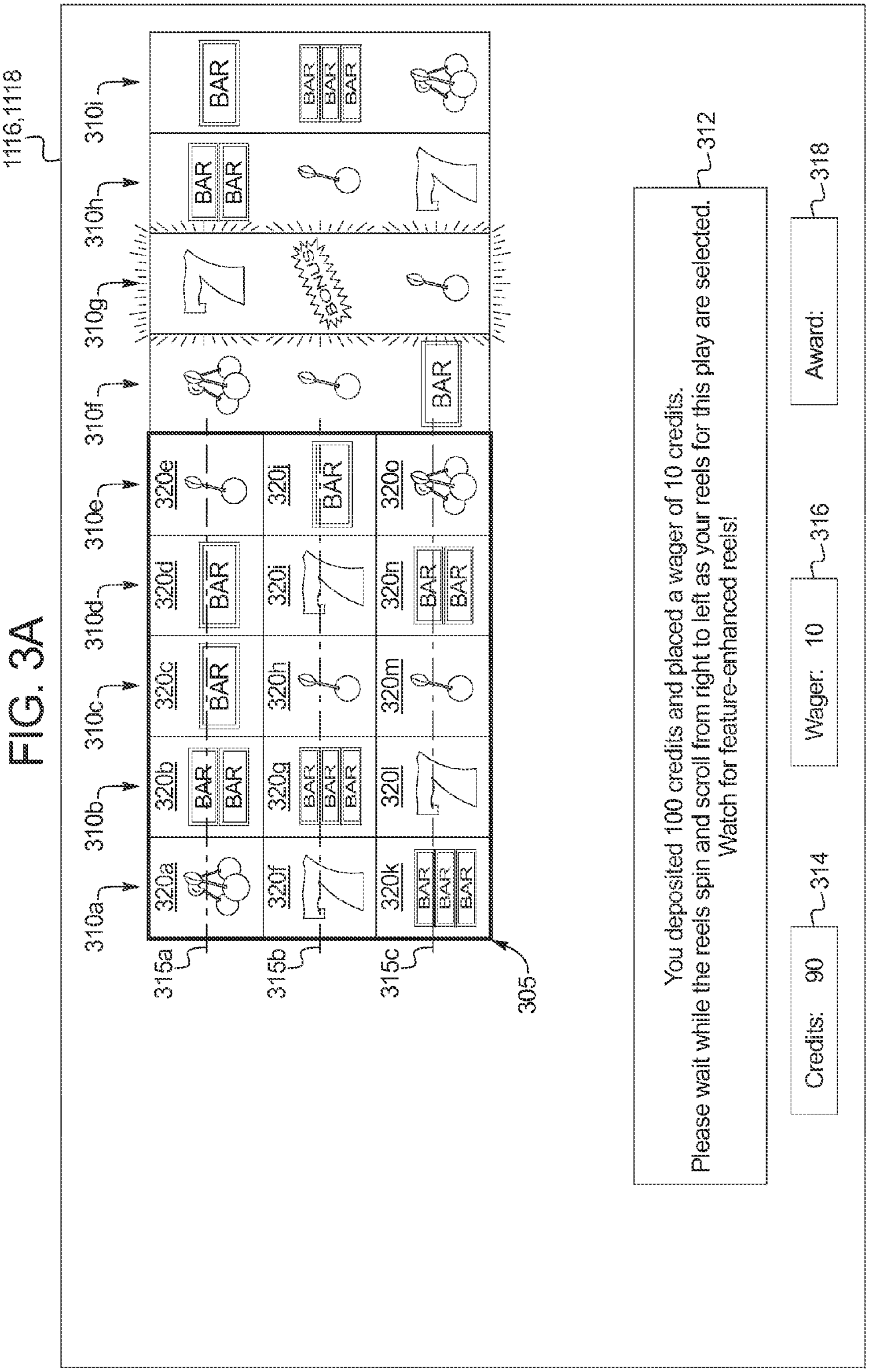
FIGS. 3A, 3B, 3C, 3D, and 3E illustrate screen shots of an example embodiment of the gaming system of the present disclosure configured to operate an example of the slot game of the present disclosure in which the slot game is associated with a predetermined initial set of reels adjacently arranged in an initial predetermined order, and in which one or more additional reels are dynamically added to the initial set during game play.

As illustrated in FIG. 3A, the gaming system receives value, such as currency (or its equivalent), from a player. In this example, the gaming system provides the player 100 credits, which represents the received value. The gaming system subsequently receives a wager of 10 credits from the player for a play of the slot game. The gaming system displays the player's wager of 10 credits in wager display 316. The gaming system displays the player's total remaining credit balance of 90 credits (i.e., the player's initial credit balance of 100 credits minus the player's wager of 10 credits) in credit meter 314. The gaming system displays the following message in message box 312: "YOU DEPOSITED 100 CREDITS AND PLACED A WAGER OF 10 CREDITS. PLEASE WAIT WHILE THE REELS SPIN AND SCROLL FROM RIGHT TO LEFT AS YOUR REELS FOR THIS PLAY ARE SELECTED. WATCH FOR FEATURE-ENHANCED REELS!"

Figure 3B:
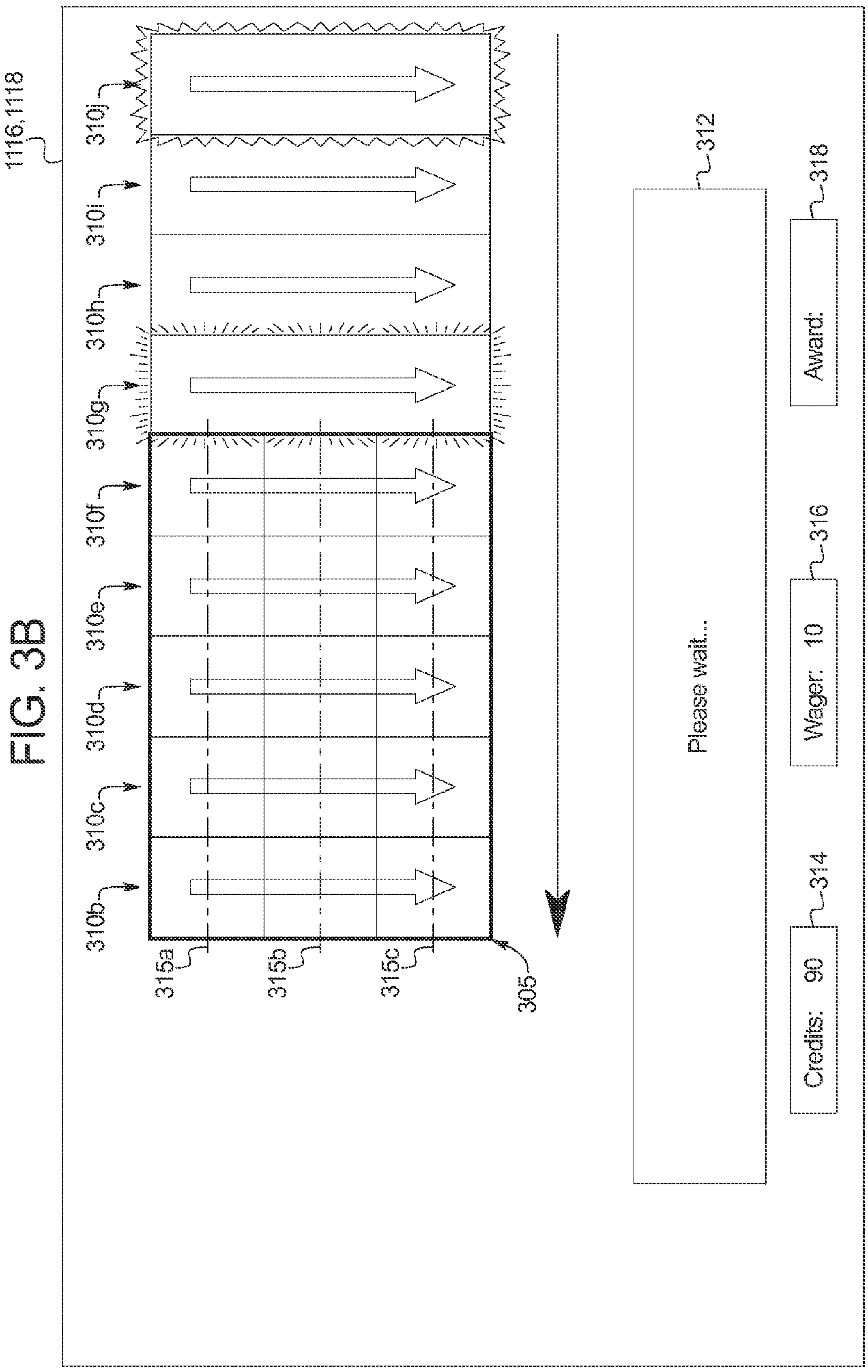

As illustrated in FIG. 3B, in this example, upon initiation of the play of the slot game, the gaming system displays each of the reels spinning. The gaming system sequentially displays the reels scrolling from right to left through reel set indicator 305. In this illustrated example, once a reel scrolls from right to left and exits reel set indicator 305, the gaming system removes that reel from the display device such that that reel is no longer displayed. As shown in FIG. 3B, the reels have scrolled from right to left to the left such that reel 310*a* exited reel set indicator 305 and is no longer displayed; reel 310*b* is the leftmost reel; and the gaming system randomly selected reel 310*j* from the pool of reels and displayed reel 310*j* adjacent to reel 310*i*. As the reels continue scrolling, the gaming system displays the following message in message box 312: "PLEASE WAIT . . . "

Figure 3C:
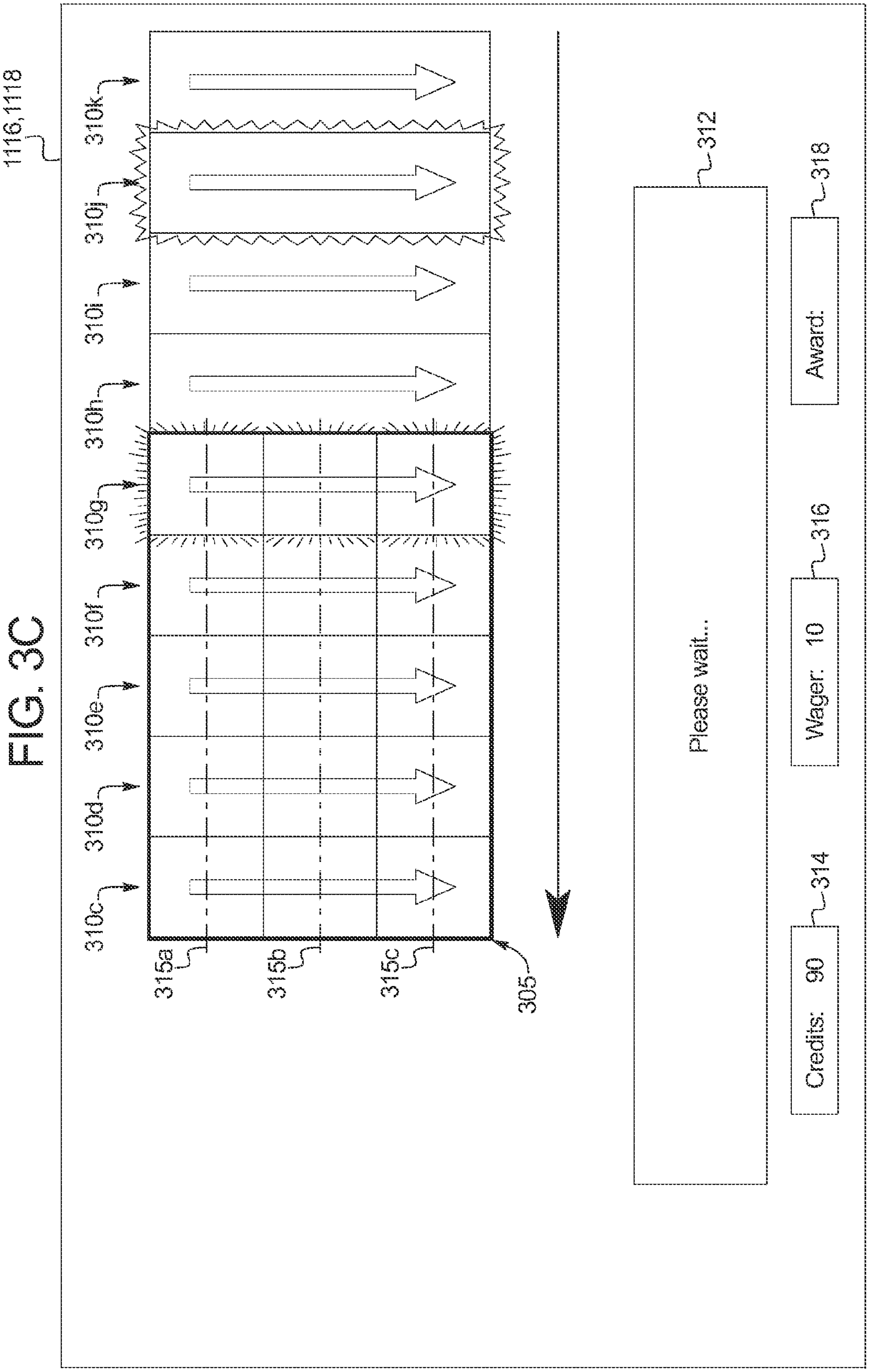

As illustrated in FIG. 3C, after further scrolling from right to left, reel 310*b* exited reel set indicator 305 and is no longer displayed; reel 310*c* is the leftmost reel; and the gaming system randomly selected reel 310*k* from the pool and displayed reel 310*k* adjacent to reel 310*j*. As the reels continue scrolling, the gaming system displays the following message in message box 312: "PLEASE WAIT . . . "

Figure 3D:
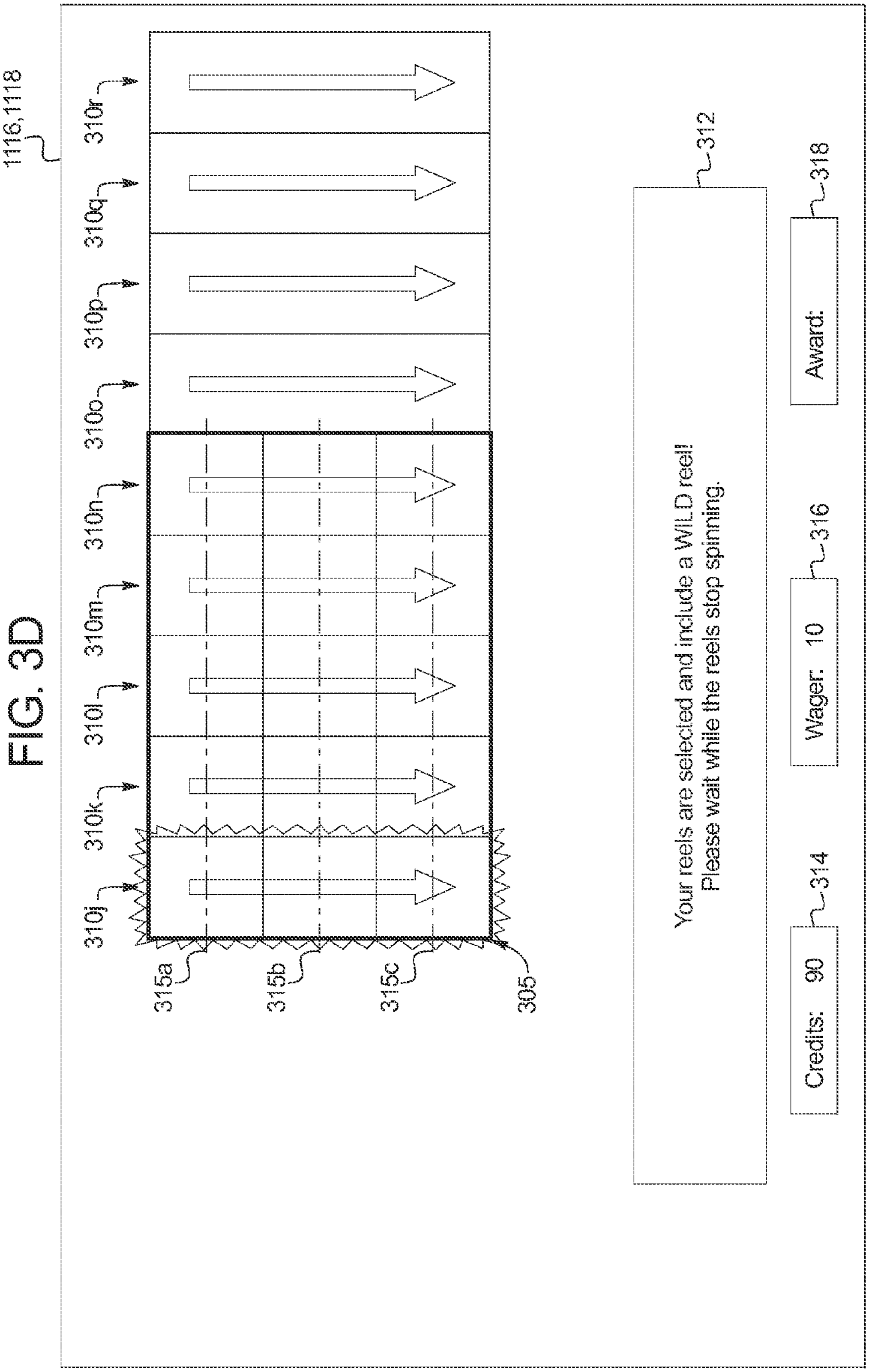

The gaming system selects a set of five of the reels, wherein each of the selected reels is adjacent to at least one of the other selected reels. In this example, the gaming system selects reels 310*j*, 310*k*, 310*l*, 310*m*, and 310*n*. As illustrated in FIG. 3D, the gaming system stops sequentially displaying the reels such that the selected reels are displayed in reel set indicator 305 and in association with the symbol display areas. The gaming system displays the following message in message box 212: "YOUR REELS ARE SELECTED AND INCLUDE A WILD REEL!PLEASE WAIT WHILE THE REELS STOP SPINNING." In this illustrated example, once the gaming system stops sequentially displaying the reels such that the selected reels are displayed in association with the symbol display areas, the gaming system grays out; crosses out; dims; stops displaying (i.e., removes such reels from the display device); or otherwise indicates that the non-selected reels are not being used for the remainder of the play of the slot game.

Figure 3E:
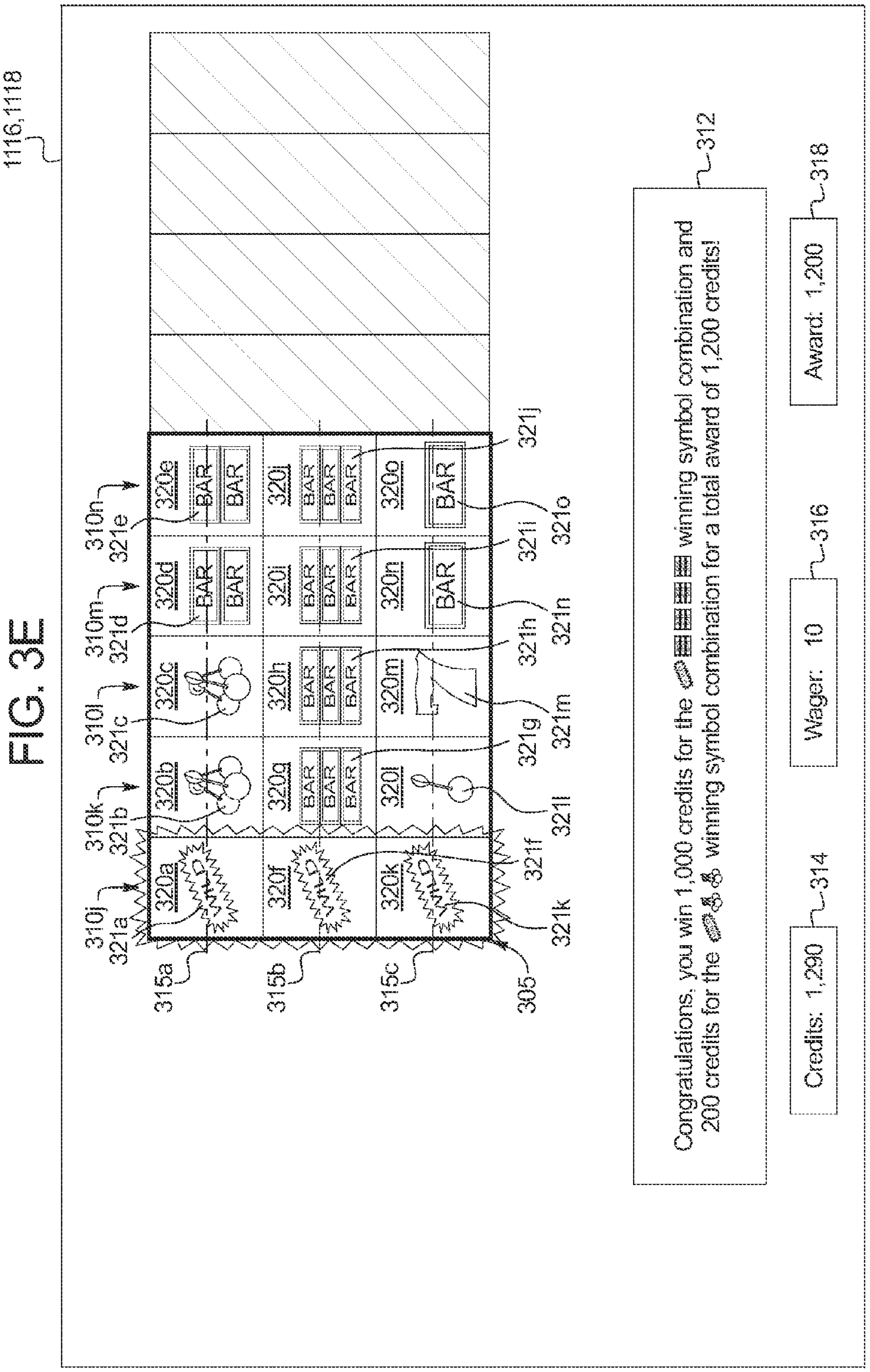

As illustrated in FIG. 3E, the gaming system generates and displays a plurality of the symbols on the selected reels at the symbol display areas. Specifically, in this illustrated example, the gaming system generates and displays: Wild symbol 321*a* at symbol display area 320*a*, Triple Cherry symbol 321*b* at symbol display area 320*b*, Triple Cherry symbol 321*c* at symbol display area 320*c*, Double Bar symbol 321*d* at symbol display area 320*d*, Double Bar symbol 321*e* at symbol display area 320*e*, Wild symbol 321*f* at symbol display area 320*f*, Triple Bar symbol 321*g* at symbol display area 320*g*, Triple Bar symbol 321*h* at symbol display area 320*h*, Triple Bar symbol 321*i* at symbol display area 320*i*, Triple Bar symbol 321*j* at symbol display area 320*j*, Wild symbol 321*k* at symbol display area 320*k*, Cherry symbol 321*l* at symbol display area 320*l*, Seven symbol 321*m* at symbol display area 320*m*, Bar symbol 321*n* at symbol display area 320*n*, and Bar symbol 321*o* at symbol display area 320*o*.

The gaming system makes an award determination based on the displayed symbols. More specifically, the gaming system determines whether the displayed symbols form any of a plurality of different winning symbol combinations along paylines 310*a*, 310*b*, and/or 310*c*. In this example, the gaming system determines an award of 200 credits associated with the Wild-Triple Cherry-Triple Cherry winning symbol combination (which acts as a Triple Cherry-Triple Cherry-Triple Cherry winning symbol combination by virtue of the Wild symbol) formed by symbols 321*a*, 321*b*, and 321*c* displayed along payline 310*a*. The gaming system also determines an award of 1,000 credits associated with the Wild-Triple Bar-Triple Bar-Triple Bar-Triple Bar winning symbol combination (which acts as a Triple Bar-Triple Bar-Triple Bar-Triple Bar-Triple Bar winning symbol combination by virtue of the Wild symbol) displayed along payline 310*b*. The gaming system displays the total award of 1,200 credits in award display 318 and updates the player's credit balance indicated by credit meter 318 to 1,290 credits to reflect the 1,200 credit award. The gaming system displays the following message in message display 312 displays the following message: "CONGRATULATIONS, YOU WIN 1,000 CREDITS FOR THE WILD-TRIPLE BAR-TRIPLE BAR-TRIPLE BAR-TRIPLE BAR WINNING SYMBOL COMBINATION AND 200 CREDITS FOR THE WILD-TRIPLE CHERRY-TRIPLE CHERRY WINNING SYMBOL COMBINATION FOR A TOTAL AWARD OF 1,200 CREDITS!"

In another such embodiment, if the gaming system has sequentially displayed all of the initial set of reels according to the initial order before selecting the set of the reels to employ and stopping the sequential display, the gaming system selects an additional reel from the pool of reels to display. In this embodiment, the gaming system continues to select and display such additional reels until the first of: (a) the gaming system selects a set of the reels and subsequently stops sequentially displaying the reels such that the selected reels are displayed in association with the symbol display areas, and (b) the gaming system has selected a maximum quantity of additional reels. In this embodiment, if the gaming system selects the maximum quantity of additional reels before the gaming system selects a set of the reels and subsequently stops sequentially displaying the reels such that the selected reels are displayed in association with the symbol display areas, the gaming system repeats the sequential display of the reels until the gaming system selects the set of reels and subsequently stops sequentially displaying the reels such that the selected reels are displayed in association with the symbol display areas. Thus, in this embodiment, the gaming system repeats the sequential display of the reels (if necessary) after the gaming system selects and displays the maximum quantity of reels.

In other such embodiments, the slot game is not associated with a pool of a plurality of reels from which additional reels are selected. Rather, in these embodiments, the gaming system dynamically generates an additional reel (such as by creating a reel from a pool of available symbols) whenever an additional reel is needed.

In certain embodiments, the slot game is a multiplay game including at least two reel set indicators each including a plurality of symbol display areas. In one such embodiment, the gaming system displays the reel set indicators such that they do not abut one another and such that a gap is present between the reel set indicators. The gaming system sequentially displays the reels as scrolling from right to left (or in any other suitable direction(s)) through a first one of the reel set indicators, then through the gap, and then through the second one of the reel set indicators. In this embodiment, the reels scrolling through the gap are not displayed and, therefore, have no effect on the outcome of the multiplay game unless and until they are displayed in one of the reel set indicators when the gaming system stops sequentially displaying the reels. In other embodiments, the gaming system displays the reel set indicators such that they abut one another and such that a gap is not present between the reel set indicators. Thus, in this embodiment, while the gaming system sequentially displays the reels as scrolling from right to left (or in any other suitable direction(s)), the reels scroll from the first reel set indicator directly into the second reel set indicator.

In other embodiments in which the slot game is a multiplay game, each reel set indicator is associated with a separate plurality of reels. That is, in these embodiments, the gaming system does not select the set of reels to employ in each game of the multiplay game from the same plurality of reels.

In various embodiments, the gaming system displays a preview window. In one such embodiment, the gaming system displays in the preview window a representation of all of (or a subset of) the plurality of reels associated with the slot game arranged in the predetermined order along with an indicator showing where in the predetermined order the reels currently displayed in the reel set window are located. In one such embodiment, the displayed representation of the reels are accurate "mini" representations of the reels. In another such embodiment, the displayed representation of the reels includes the indicators (if any) associated with the reels. For instance, in one example the slot game is associated with twenty reels, five of which may be displayed in association with the symbol display areas. In this example, the gaming system displays a preview window including "mini" representations of each of the twenty reels arranged in the predetermined order and a rectangular indicator surrounding the five reels currently displayed in association with the symbol display areas. As the reels scroll through the symbol display areas, the indicator also scrolls to indicate where in the order the reels currently displayed in association with the symbol display areas are located.

While in the embodiments described above the reels stop spinning after the gaming system stops sequentially displaying the reels such that the selected reels are displayed in the reel set indicator, it should be appreciated that, in various other embodiments, one or more of the reels stop spinning before the gaming system begins sequentially displaying the reels, while the gaming system is sequentially displaying the reels, or as the gaming system stops sequentially displaying the reels such that the selected reels are displayed. In one example, upon initiation of a play of the slot game, the gaming system spins and stops the reels such that each reel displays a plurality of the symbols on that reel. The gaming system subsequently begins sequentially displaying the reels, selects the set of the reels to employ for the play of the slot game, and stops sequentially displaying the reels such that the selected reels are displayed. In another example, upon initiation of a play of the slot game, the gaming system spins the reels, begins sequentially displaying the reels while the reels are spinning, selects the set of reels to employ for the play of the slot game, stops spinning the reels, and thereafter stops sequentially displaying the reels such that the selected reels are displayed. It should be appreciated that the gaming system may start and stop spinning the reels and start and stop sequentially displaying the reels at any suitable time(s). It should also be appreciated that the gaming system may start and stop spinning different reels at different times.

It should be appreciated that each of the plurality of the reels may be associated with any suitable feature or features. For instance, in various embodiments, each such reel is associated with one or more of the following features: (a) a wild reel feature that causes the reel to, when stopped, display all Wild symbols or that is a solid reel including all wild symbols; (b) a bonus reel feature that causes the reel to, when stopped, display a quantity of bonus trigger symbols sufficient to trigger a play of a bonus feature; (c) a horizontal large symbol feature in which one or more symbols spans at least two adjacent reels (and thus spans and is configured to be displayed at at least two horizontally adjacent symbol display areas); (d) a vertical large symbol feature in which one or more symbols on that reel spans and is configured to be displayed at at least two vertically adjacent symbol display areas; (e) a vertical or a horizontal tumbling reels feature; (f) a sticky wilds feature in which at least one Wild symbol is guaranteed to be generated and displayed at a specific location on that reel following the spin; (g) a multiplier wilds feature in which at least one Wild symbol on that reel is associated with a multiplier used to modify any awards; (h) a symbol stack feature in which one or more stacks of identical symbols are included on that reel; (i) a changing symbol stack feature in which the symbols that are stacked change as the reels scroll; (j) a wild reel feature that causes the reel to, when stopped, display all Wild symbols a certain percentage of the time, wherein the percentage is less than 100%; (k) a bonus game feature that causes the gaming system to initiate a play of a bonus game when the reel associated with the bonus game feature is selected; (l) a split symbol feature in which two or more symbols are displayable at a same symbol display area; (m) a feature that syncs the spin of the reel with at least one adjacent reel including at least one common symbol such that the common symbols form a horizontal symbol stack if generated and displayed at the symbol display areas; and (n) a trigger feature that, upon an occurrence of a triggering event such as the generation and display of a trigger symbol, causes the gaming system to modify one or more of the symbols at least one other reel (e.g., the generation and display of the trigger symbol causes the gaming system to change all Cherry symbols on each reel to Wild symbols).

It should also be appreciated that each feature may be associated with any suitable indicator or indicators that represent that feature. For instance, in various embodiments, each feature is associated with one or more of the following indicators: (a) one of a plurality of different colors; (b) one of a plurality of different patterns; (c) one of a plurality of different sound effects; (d) one of a plurality of different lighting effects; (e) a symbol trail or blur effect; (f) one of a plurality of different tactile effects (e.g., one of a plurality of different vibrations); (g) one of a plurality of different reel speeds (e.g., reels associated with more valuable features spin more slowly (or more quickly) than reels associated with less valuable features or reels that are not associated with any features); and (h) one of a plurality of different spin directions (e.g., downward, upward, left to right, or right to left). In one embodiment, each feature is associated with a different indicator. In another embodiment, at least two features are associated with the same indicator. In another embodiment, a feature is associated with at least two of the reels (such as three adjacent reels).

Figure 4:
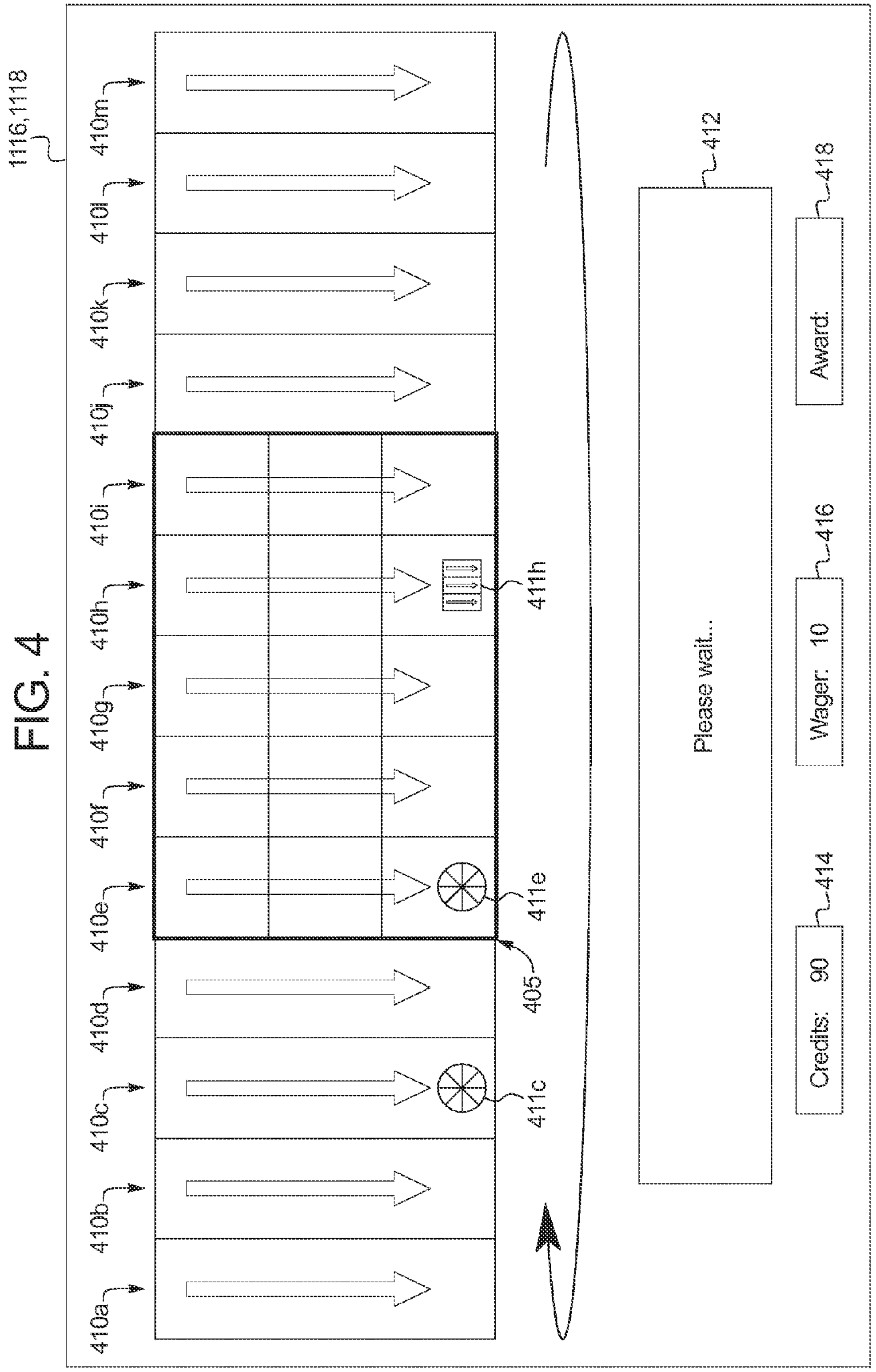
FIG. 4 illustrates a screen shot of an example embodiment of the gaming system of the present disclosure configured to operate an example of the slot game of the present disclosure in which the indicators are representations of bonus game features.

In certain embodiments, for one or more features, the indicator is a representation of the feature itself and is displayed on or in association with each respective reel. For instance, if the feature is a play of a bonus game, the indicator is a representation of that bonus game. FIG. 4 illustrates a screen shot of an example of one such embodiment of the slot game of the present disclosure. In this example, reels 410*c*, and 410*e* are each associated with a wheel bonus game feature. Reels 410*c* and 410*e* are each also associated with indicators 411*c* and 411*e*, respectively, which are representations of the wheel used for the play of the wheel bonus game. Similarly, in this example, reel 410*h* is associated with a free spin bonus game feature. Reel 410*h* is also associated with an indicator 411*h*, which is a representation of the reels used in the free spin bonus game.

Figure 5:
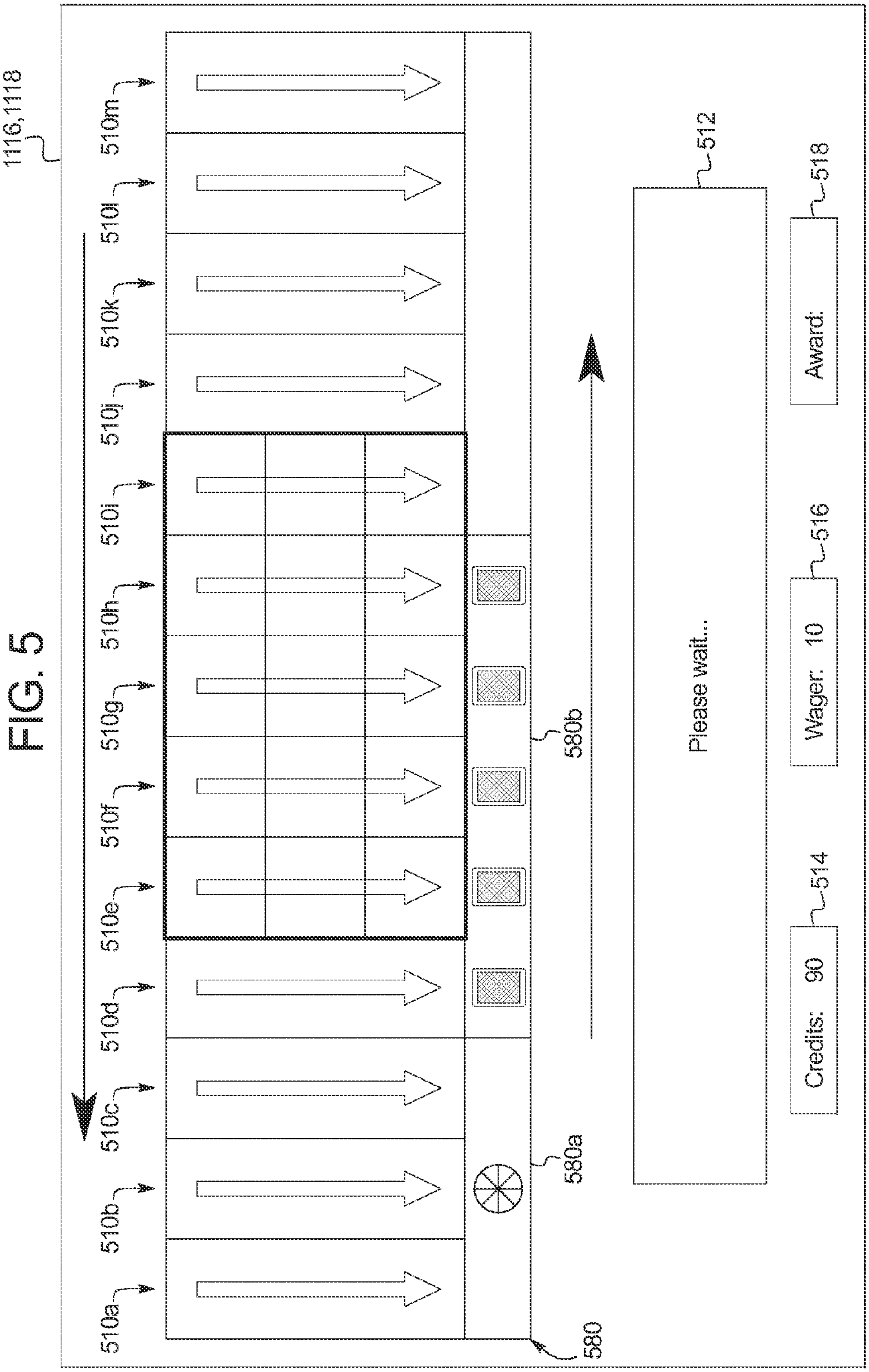
FIG. 5 illustrates a screen shot of another example embodiment of the gaming system of the present disclosure configured to operate an example of the slot game of the present disclosure in which the indicators are representations of bonus game features.

FIG. 5 illustrates a screen shot of another example of one such embodiment of the slot game of the present disclosure. In this example, the gaming system displays a set of indicators 580 including indicators 580*a* and 580*b* below the reels, and displays these indicators as scrolling from left to right while the gaming system sequentially displays the reels as scrolling from right to left. Each reel is associated with the feature identified by the indicator displayed adjacent that reel when the gaming system stops displaying the scrolling indicators and the scrolling reels. In this example, reels 510*a*, 510*b*, and 510*c* are each associated with indicator 580*a*, which is a representation of the wheel used for the play of a wheel bonus game, and, therefore, with the wheel bonus game feature at this point in time. Similarly, reels 510*d*, 510*e*, 510*f*, 510*g*, and 510*h* are each associated with indicator 580*b*, which is a representation of the cards used for the play of a poker game, and, therefore with the poker game feature at this point in time. In other embodiments, the gaming system sequentially displays the reels and the indicators scrolling in the same direction and/or at different speeds.

In certain embodiments, at least one of the reels is associated with a feature that provides a chance of winning one or more free plays of a bonus game. In one such embodiment, when the gaming system selects to employ such a reel for a play of the slot game, the gaming system randomly determines whether to provide one or more free plays of the bonus game. For instance, in one example, the gaming system displays a band of bonus trigger symbols adjacent to the reels, and displays the band of bonus trigger symbols scrolling and, eventually, stopping such that a bonus trigger symbol is displayed adjacent to at least one of the selected reels. If one of the selected reels is associated with a feature that provides a chance of winning one or more free plays of a bonus game, and if the bonus trigger symbol displayed adjacent to that selected reel has a designated relationship with the bonus game, the gaming system provides at least one free play of that bonus game.

In another example, each reel associated with a feature that provides a chance of winning one or more free plays of a bonus game includes at least one bonus trigger symbol. In this example, the gaming system displays a band of bonus trigger symbols adjacent to the reels, and displays the band of bonus trigger symbols scrolling and, eventually, stopping such that a bonus trigger symbol is displayed adjacent to at least one of the selected reels. If one of the selected reels is associated with a feature that provides a chance of winning one or more free plays of a bonus game and displays the bonus trigger symbol, and if the displayed bonus trigger symbol has a designated relationship with the bonus trigger symbol displayed on the band adjacent to that selected reel, the gaming system provides at least one free play of that bonus game.

In this example, the gaming system separately determines when to stop sequentially displaying the reels and when to stop sequentially displaying the indicators. It should thus be appreciated that, in this example, the features associated with the reels are not determined until after the reels and the indicators stop scrolling. In one embodiment, each of the reels associated with a single indicator must be selected to be employed for the play of the slot game for the bonus game to be initiated. For example, each of reels 510*a*, 510*b*, and 510*c* must be selected and displayed in reel set indicator 505 for the wheel bonus game to be initiated. In another embodiment, a designated quantity of at least one, but fewer than all, of the reels must be selected and displayed in reel set indicator 505 for the wheel bonus game to be initiated. For example, only one of reels 510*a*, 510*b*, and 510*c* must be selected and displayed in reel set indicator 505 for the wheel bonus game to be initiated.

In the embodiments described above, the reels scroll linearly from right to left or left to right. It should be appreciated that, in other embodiments, the reels scroll along or follow a track having one of a plurality of different shapes, such as an oval shape or a circle shape. For example, the gaming system sequentially displays the reels scrolling clockwise (or counterclockwise) along an oval-shaped track having one side in the foreground and an opposite side in the background. The symbol display areas are displayed along the side of the track in the foreground. Thus, as the gaming system displays the reels scrolling clockwise along the oval shaped track, certain of the reels are displayed in the foreground scrolling from right to left (and through the symbol display areas) and certain of the reels are displayed in the background scrolling from left to right.

In certain embodiments in which the reels are arranged according to an order, the gaming system is configured to skip to another point (e.g., ahead or behind) in the order such that the gaming system skips sequentially displaying the skipped reels. This enables the gaming system to speed game play by reducing how many of the reels that will not be employed for the play of the game that the gaming system displays scrolling through the reel indicator. For instance, in one example, the slot game is associated with two hundred reels ordered 1 to 200. For a play of the slot game, the gaming system begins sequentially displaying the reels, starting with reel 1. The gaming system determines to select reels 196, 197, 198, 199, and 200 to employ for the play of the slot game. Rather than sequentially displaying the reels according to the predetermined order until reels 196 to 200 are displayed in the reel indicator, the gaming system sequentially displays reels 1 to 15, skips (i.e., does not display) reels 16 to 190, sequentially displays reels 190 to 200, and stops displaying the reels such that reels 196 to 200 are displayed in the reel indicator. Thus, in this example, the gaming system displays the reels in the following order: 1, 2, 3, 4, 5, 6, 7, 8, 9, 10, 11, 12, 13, 14, 15, 190, 191, 192, 193, 194, 195, 196, 197, 198, 199, and 200.

In certain embodiments, the gaming system adds additional reels to the plurality of reels associated with the slot game when one or more conditions are satisfied. In one embodiment, the gaming system adds an additional reel to the plurality of reels when the player pays a fee. In another embodiment, the gaming system adds an additional reel to the plurality of reels when the player places a side wager. In another embodiment, the gaming system adds an additional reel to the plurality of reels when the player places a wager of at least a designated amount (such as a maximum wagerable amount). In various embodiments, different additional reels are associated with different conditions. For instance, the gaming system adds a wild reel to the plurality of reels if the player places a maximum wager, and adds a reel including a bonus trigger symbol if the player places a side wager.

In one embodiment, the gaming system may select reels that are not adjacent to any other selected reels to employ for a play of the slot game. For example, if the slot game is associated with fifty reels ordered 1 to 50, the gaming system may select to employ reels 5, 8, 10, 37, and 41, none of which are adjacent to each other, for a play of the slot game. In one embodiment, the gaming system highlights or otherwise emphasizes the selected reels as the gaming system displays those reels scrolling through the reel indicator. In another embodiment, when the gaming system displays a selected reel scrolling through the reel indicator, the gaming system "locks" that selected reel into place. Continuing with the above example, if the gaming system selects to employ reels 5, 8, 10, 27, and 41 for the play of the slot game, the gaming system sequentially displays the reels scrolling through the reel indicator and locks reels 5, 8, 10, 27, and 41 into place as they scroll through the reel indicator. Put differently, in this embodiment, the gaming system "builds" the set of selected reels to employ for the play of the slot game as the gaming system displays those selected reels scrolling through the reel indicator.

It should be appreciated that: (a) the number of reels associated with the slot game, (b) the order of the adjacently arranged reels, (c) the number of reels associated with features, (d) the specific reels that are each associated with a feature, (e) the available feature(s) with which one or more reels may be associated, (f) the maximum number of reels (if applicable), (g) which reels the gaming system selects to employ for the play of the slot game, (h) the reels of the initial set (if applicable), (i) the quantity of reels included in the initial set (if applicable), (j) the quantity of reels in the pool, (k) the quantity of reels the gaming system employs for the play of the slot game, (l) the amount of time elapsed between the time the gaming system starts sequentially displaying the reels and the time the gaming system stops sequentially displaying the reels, (m) the specific features associated with the individual reels, and/or (n) any other suitable element disclosed herein may be: (1) predetermined; (2) randomly determined; (3) randomly determined based on one or more weighted percentages; (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an electronic gaming machine (EGM) configured to operate the slot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager; (17) determined independent of the player's primary game wager; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more weighted tables; (25) determined based on one or more other determinations disclosed herein; (26) determined independent of any other determination disclosed herein; and/or (27) determined in any other suitable manner or based on or independent of any other suitable factor(s).

While the embodiments described above are video embodiments, it should be appreciated that the present disclosure contemplates being implemented in mechanical and/or an electro-mechanical embodiments such as those described below. In one example, the reels are video reels coupled to a rotating mechanical track. As the mechanical track rotates, the video reels are sequentially displayed as scrolling through the symbol display areas. In another example, the reels are mechanical reels coupled to a rotating mechanical track. As the mechanical track rotates, the mechanical reels are sequentially displayed as scrolling through the symbol display areas.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 6A:
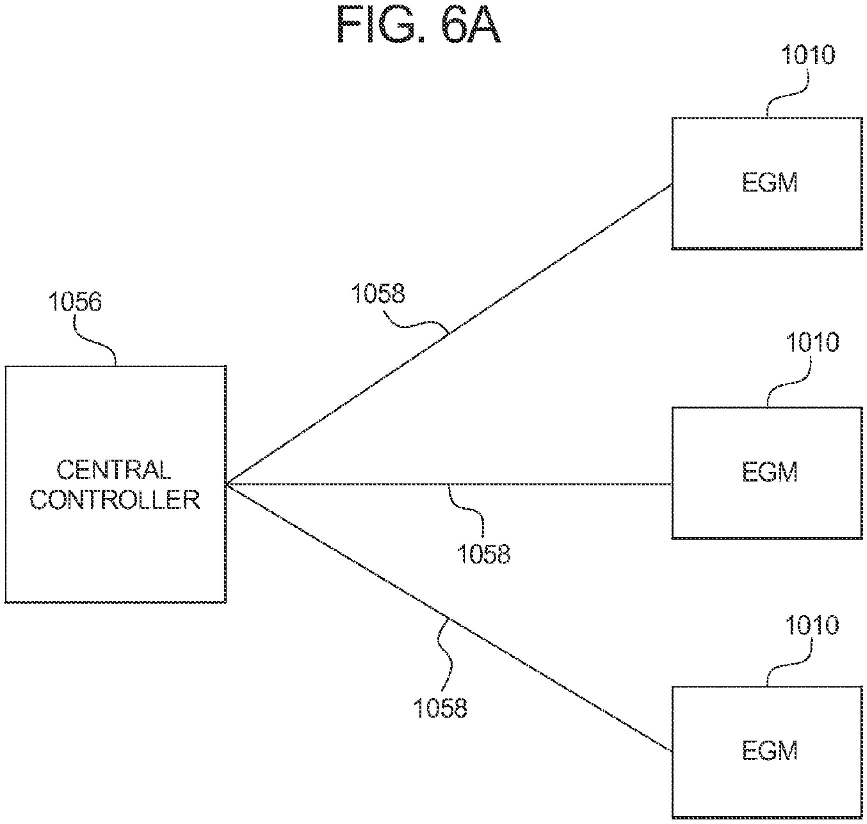
FIG. 6A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 6A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 6B:
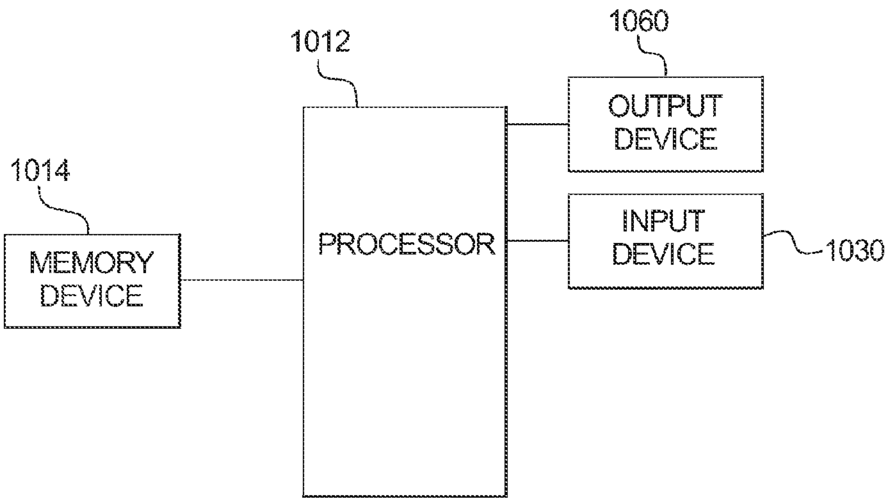
FIG. 6B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 6B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 6B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 7A:
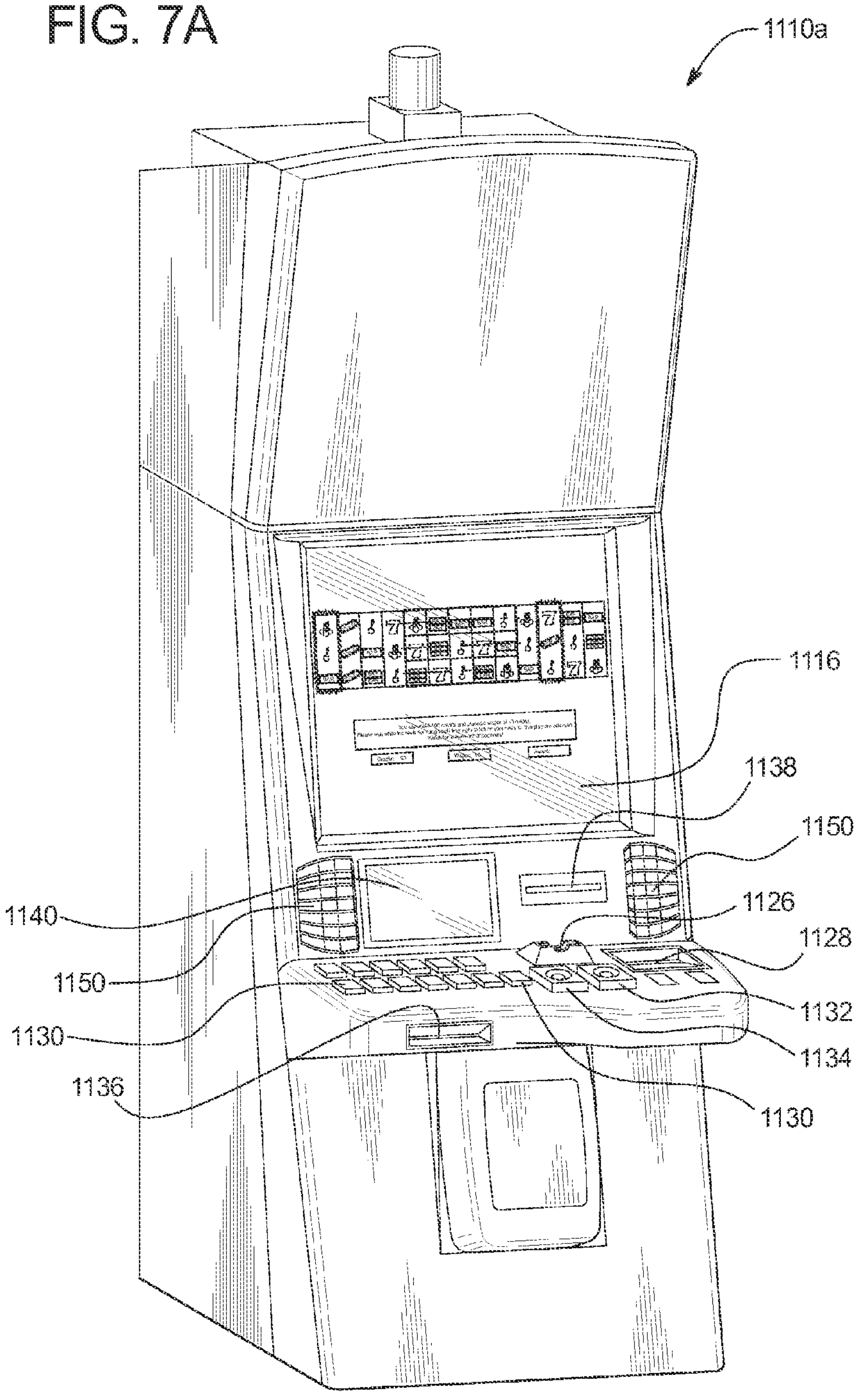
FIGS. 7A and 7B are perspective views of example alternative embodiments of the gaming system of the present disclosure.
Figure 7B:
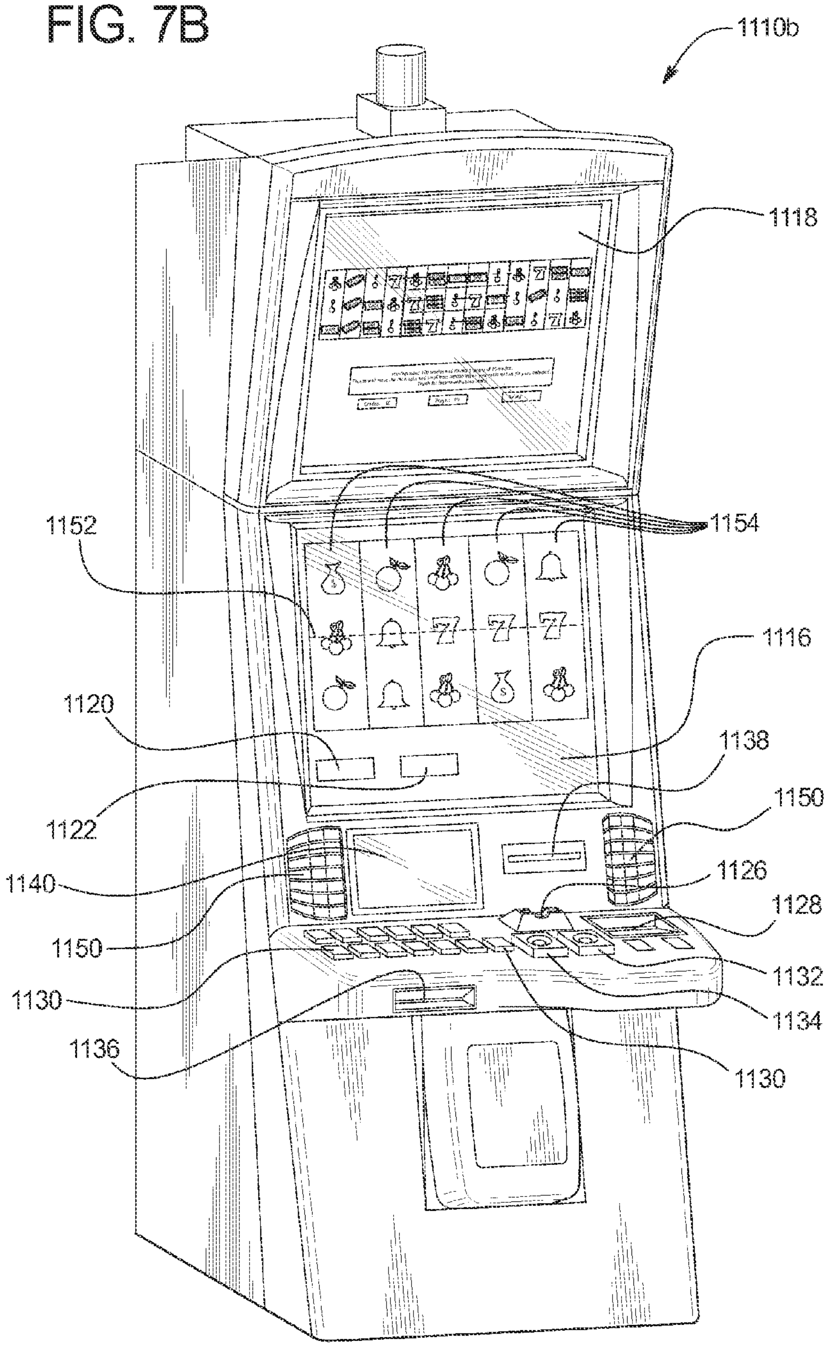

In various embodiments, the EGM includes one or more input devices. The input devices may include any suitable device that enables an input signal to be produced and received by the at least one processor of the EGM. The example EGM illustrated in FIG. 6B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 7A and 7B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 7A and 7B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 7A and 7B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below).

One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 7A and 7B each include a card reader 1138. The card reader is configured to read a player identification card inserted into the card reader.

In various embodiments, the EGM includes one or more output devices. The example EGM illustrated in FIG. 6B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 7A includes a central display device 1116, a player tracking display 1140, a credit display 1120, and a bet display 1122. The example EGM illustrated in FIG. 7B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 7A and 7B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 7A and 7B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 7A and 7B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 7A and 7B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 7A and 7B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor;

at least one display device;

at least one input device; and at least one memory device storing a plurality of instructions which, when executed by the at least one processor, cause the at least one processor to operate with the at least one display device and the at least one input device to:

(a) initiate a play of a game associated with a plurality of adjacently arranged reels including a plurality of symbols, wherein each of a plurality of the reels is associated with one of a plurality of different features and a feature indicator representing said feature;

(b) begin sequentially displaying each of the plurality of the reels and, for each of the plurality of the reels, display the corresponding feature indicator in association with said reel;

(c) select a set of two or more of each of the plurality of the reels, wherein each of the selected reels is adjacent to at least one of the other selected reels;

(d) stop sequentially displaying each of the plurality of the reels such that the set of selected reels are displayed in association with a plurality of symbol display areas;

(e) generate and display a plurality of the plurality of symbols on the set of selected reels at the symbol display areas;

(f) determine whether any of a plurality of different winning symbol combinations are displayed;

(g) determine any awards associated with any displayed winning symbol combinations; and (h) provide any determined awards.

2. The gaming system of claim 1, wherein the plurality of reels is predetermined.

3. The gaming system of claim 1, wherein the plurality of instructions, when executed by the at least one processor, cause the at least one processor to add an additional reel to the plurality of reels after beginning the sequential display of the plurality of the reels.

4. The gaming system of claim 1, wherein the plurality of instructions, when executed by the at least one processor, cause the at least one processor to operate with the at least one display device to sequentially display the plurality of the reels by displaying the plurality of the reels scrolling one of: (a) left to right and (b) right to left according to an order.

5. The gaming system of claim 4, wherein the order is predetermined.

6. The gaming system of claim 4, wherein the order is modified during said play of the game.

7. The gaming system of claim 1, wherein the features include at least two selected from the group consisting of: (a) a feature that causes a reel to include one or more wild symbols, (b) a feature that causes a reel to include one or more bonus trigger symbols, (c) a feature that causes a reel to include a symbol configured to be displayed at least two adjacent symbol display areas, and (d) a feature that activates tumbling reels for said play of the game.

8. The gaming system of claim 1, wherein, for each of the plurality of the reels, the feature indicator representing the feature associated with said reel includes at least one selected from the group consisting of: (a) a lighting effect, (b) an auditory effect, and (c) a tactile effect.

9. The gaming system of claim 1, wherein the plurality of instructions, when executed by the at least one processor, cause the at least one processor to operate with the at least one display device to sequentially display each of the plurality of the reels by displaying each of the plurality of the reels scrolling such that one or more of the plurality of reels that are not displayed in association with the symbol display areas are displayed behind the plurality of reels that are displayed in association with the symbol display areas.

10. A method of operating a gaming system, said method comprising:

(a) causing at least one processor to execute a plurality of instructions stored in at least one memory device to initiate a play of a game associated with a plurality of adjacently arranged reels including a plurality of symbols, wherein each of a plurality of the reels is associated with one of a plurality of different features and a feature indicator representing said feature;

(b) causing the at least one processor to execute the plurality of instructions to operate with at least one display device to begin sequentially displaying each of the plurality of the reels and, for each of the plurality of the reels, display the corresponding feature indicator in association with said reel;

(c) causing the at least one processor to execute the plurality of instructions to select a set of two or more of each of the plurality of the reels, wherein each of the selected reels is adjacent to at least one of the other selected reels;

(d) causing the at least one processor to execute the plurality of instructions to operate with the at least one display device to stop sequentially displaying each of the plurality of the reels such that the set of selected reels are displayed in association with a plurality of symbol display areas;

(e) causing the at least one processor to execute the plurality of instructions to operate with the at least one display device to generate and display a plurality of the plurality of symbols on the set of selected reels at the symbol display areas;

(f) causing the at least one processor to execute the plurality of instructions to determine whether any of a plurality of different winning symbol combinations are displayed;

(g) causing the at least one processor to execute the plurality of instructions to determine any awards associated with any displayed winning symbol combinations; and (h) providing any determined awards.

11. The method of claim 10, wherein the plurality of reels is predetermined.

12. The method of claim 10, which includes causing the at least one processor to execute the plurality of instructions to add an additional reel to the plurality of reels after beginning the sequential display of the plurality of the reels.

13. The method of claim 10, which includes causing the at least one processor to execute the plurality of instructions to operate with the at least one display device to sequentially display the plurality of the reels by displaying the plurality of the reels scrolling one of: (a) left to right and (b) right to left according to an order.

14. The method of claim 13, wherein the order is predetermined.

15. The method of claim 13, wherein the order is modified during said play of the game.

16. The method of claim 10, wherein the features include at least two selected from the group consisting of: (a) a feature that causes a reel to include one or more wild symbols, (b) a feature that causes a reel to include one or more bonus trigger symbols, (c) a feature that causes a reel to include a symbol configured to be displayed at least two adjacent symbol display areas, and (d) a feature that activates tumbling reels for said play of the game.

17. The method of claim 10, wherein, for each of the plurality of the reels, the feature indicator representing the feature associated with said reel includes at least one selected from the group consisting of: (a) a lighting effect, (b) an auditory effect, and (c) a tactile effect.

18. The method of claim 10, which includes causing the at least one processor to execute the plurality of instructions to operate with the at least one display device to sequentially display the reels by displaying each of the plurality of the reels scrolling such that one or more of the plurality of reels that are not displayed in association with the symbol display areas are displayed behind the plurality of reels that are displayed in association with the symbol display areas.

19. The method of claim 10, which is provided through a data network.

20. The method of claim 19, wherein the data network is an internet.

* * * * *